(12) United States Patent
Erdodi et al.

(10) Patent No.: US 9,988,555 B2
(45) Date of Patent: Jun. 5, 2018

(54) WATER-BORNE POLYAMIDE-UREA DISPERSIONS

(71) Applicant: Lubrizol Advanced Materials, Inc., Wickliffe, OH (US)

(72) Inventors: Gabor Erdodi, Macedonia, OH (US); Naser Pourahmady, Solon, OH (US); John Ta-Yuan Lai, Broadview Heights, OH (US); Anthony D. Pajerski, Broadview Heights, OH (US)

(73) Assignee: Lubrizol Advanced Materials, Inc., Wickliffe, OH (US)

(*) Notice: Subject to any disclaimer, the term of this patent is extended or adjusted under 35 U.S.C. 154(b) by 37 days.

(21) Appl. No.: 14/766,918

(22) PCT Filed: Feb. 3, 2014

(86) PCT No.: PCT/US2014/014426
§ 371 (c)(1),
(2) Date: Aug. 10, 2015

(87) PCT Pub. No.: WO2014/126741
PCT Pub. Date: Aug. 21, 2014

(65) Prior Publication Data
US 2016/0009953 A1 Jan. 14, 2016

Related U.S. Application Data

(60) Provisional application No. 61/764,216, filed on Feb. 13, 2013, provisional application No. 61/917,407, filed on Dec. 18, 2013.

(51) Int. Cl.
| | | |
|---|---|---|
| *C09D 175/12* | (2006.01) | |
| *C09D 177/06* | (2006.01) | |
| *C09J 175/12* | (2006.01) | |
| *C09J 177/06* | (2006.01) | |
| *C07C 265/14* | (2006.01) | |
| *C08J 5/18* | (2006.01) | |
| *C08G 18/60* | (2006.01) | |
| *C08G 18/08* | (2006.01) | |
| *C08G 69/26* | (2006.01) | |
| *C08G 69/34* | (2006.01) | |
| *C08G 69/40* | (2006.01) | |
| *C08G 73/06* | (2006.01) | |

(52) U.S. Cl.
CPC ....... *C09D 175/12* (2013.01); *C08G 18/0823* (2013.01); *C08G 18/603* (2013.01); *C08G 69/265* (2013.01); *C08G 69/34* (2013.01); *C08G 69/40* (2013.01); *C08G 73/0633* (2013.01); *C09J 175/12* (2013.01)

(58) Field of Classification Search
CPC .. C09D 175/12; C09D 177/06; C07C 265/14; C09J 175/12; C09J 177/06; C08J 5/18
USPC .................................................. 524/514, 501
See application file for complete search history.

(56) References Cited

U.S. PATENT DOCUMENTS

| | | | | |
|---|---|---|---|---|
| 3,935,146 A | * | 1/1976 | Noll | C08G 18/10 428/473 |
| 4,169,080 A | | 9/1979 | Spencer | |
| 4,463,157 A | | 7/1984 | Kersten et al. | |
| 2008/0223519 A1 | * | 9/2008 | Locko | C08G 18/12 156/331.7 |

FOREIGN PATENT DOCUMENTS

EP 0135209 A1 3/1985

OTHER PUBLICATIONS

Database WPI, Week 198202, Thomas Scientific, London, GB; XP002726802, -JPS56149417A (Dainippon Ink & Chem KK), Nov. 19, 1981 (Nov. 19,1981), Abstract.
Klebanskii A L et al: "A Study in the Field of Synthesis of N-Alkyl Derivatives of Hexamethylenediamine and Their Polycondensation", Journal of General Chemistry USSR, Consultants Bureau, New York, NY, US, pp. 1824-1828, XP009178770, ISSN: 0022-1279.

* cited by examiner

*Primary Examiner* — Deve E Valdez
(74) *Attorney, Agent, or Firm* — Samuel Laferty; Teresan Gilbert

(57) ABSTRACT

Polymers are disclosed that incorporate large portions of elastomeric polyamide oligomers connected with polyisocyanates. These polymers have enhanced properties over similar polyurethanes due to better hydrolysis resistance of polyamides over polyesters and better UV resistance of polyamides over polyethers. Polyurea linkages can also improve properties over polyurethane linkages. Composites and hybrids of these polymers and other polyamides with vinyl polymers are also disclosed and claimed.

19 Claims, No Drawings

WATER-BORNE POLYAMIDE-UREA DISPERSIONS

FIELD OF INVENTION

The invention relates to water borne polymer dispersions of the polyurea or polyurethane type comprising an N-alkylated polyamide segment. When put into dispersion in water it will include dispersant/surfactant either as a separate molecule component or chemically reacted with the polymer. By controlling the amount of N-alkylation of the polyamide linkages and the uniformity of spacing between the amide linkages, the properties of the polyamide portion can be controlled to provide thermoplastic and/or elastomeric properties. The polyamide can provide good solvent resistance, good elastomeric properties, resistance to UV radiation, hydrolysis resistance, etc.

BACKGROUND OF THE INVENTION

GB 779247(A) published Jul. 17, 1957 teaches linear secondary polyamides for stoving compounds (often in combination with polyisocyanates). GB 1452073(A) published Oct. 6, 1976 teaches a blend of (A) a linear polyhydroxy polymer free of ethylene terephthalate units of molecular weight 400-4000 and being liquid at 80° C.; (B) a linear polyester of molecular weight 400 to 3000, melting point of 50-220° C. and 35-95 mol % of molecular chain is ethylene terephthalate; (C) a linear polyamide of molecular weight of 400-4000 and melting point of 100 to 200° C. in which at least 80% of the terminal groups are amino groups, and (D) an organic diisocyanate.

AU 669215(B2) published May 12, 1994 taught a 200-2000 molecular weight polyamide from various anhydrides or diacid halides with diamines, amino alcohol, amino thiol, and mixtures of these amine compounds. The polyamide is 6 to 25 wt. % of the total resins. The polyamide is reacted with excess diisocyanate to create an isocyanate terminated resin of 25,000 to 50,000 molecular weight. The resins are used in solvent based coatings.

EP 595281(A2) to BASF published May 4, 1994 and teaches a water dispersible ionic and nonionic polyamide modified polyurethane for use in automobile clearcoat and basecoat systems. The AU equivalent is AU 4903693.

EP595286(A1) to BASF published May 4, 1994 and interpreted based on AU-B-49162/93 teaches a solvent borne polyamide modified polyurethane resin for use in automotive clearcoat and basecoat.

"Novel Poly(urethane-amide)s from Polyurethane Prepolymer and Reactive Polyamides. Preparation and Properties", Polymer Journal, Vol. 34, No. 6, pp 455-460 (2002) describes a soluble polyamide containing aliphatic hydroxyl group in the backbone that were reacted with a polyurethane prepolymer with isocyanate groups that were endcapped with phenol. The polyamide and prepolymer were mixed together and cast on glass substrates. The cast films were treated with heat to release the phenol, thereby unblocking the isocyanates, which then reacted with the hydroxyl groups of the polyamide.

U.S. Pat. No. 7,276,570 assigned to Acushnet Company discloses compositions for golf equipment, such as golf balls comprising thermoplastic, thermoset, castable, or millable elastomer compositions comprising at least one polymer having a plurality of anionic moieties attached thereto. The compositions can be used as part of golf ball construction.

WO2006/053777 A1 to Novartis Pharma GmbH discloses crosslinkable poly(oxyalkylene) containing polyamide prepolymers that can be used to provide water-soluble prepolymers that can be used as a component in contact lenses.

US 2006/0047083A1 published Mar. 2, 2006 discloses triblock thermoplastic polymers of the ABA type wherein the A blocks represent hard segments such as urethane, urea, urethane-urea, or amide type segments and the B blocks represent soft segments such as aliphatic polyethers, aliphatic polyesters, poly(dimethylsiloxane)s, polyalkanes and their copolymers.

US2008/081870A1 (equivalent to EP 190577(A2)) to Bayer describes a size composition comprising polyurethane-polyurea repeat units with carboxylic amide containing repeat units. The backbone contains 0.75 to 10 wt. % C(O)—NH groups. The composition is used as a sizing for glass fibers used in nylon compositions.

U.S. Pat. No. 5,610,224 (equivalent to EP059581) to BASF discloses an ionic and nonionic polyamide modified polyurethane polymers for use in coating compositions, method for forming, and coating compositions containing these polymers.

US 2008/0223519 A1 (equivalent WO2008/070762 A1) assigned to Arizona Chemical Company discloses polyamide polyols and polyurethanes, methods for making and using and products made therefrom. It discloses reaction products of a polymeric and non-polymeric diamine with dicarboxylic acid and hydroxy substituted carboxylic acid. It also discloses reactions of the polyamide with diisocyanates.

"Polyurethane-Amide Hybrid Dispersions", Journal of Polymer Engineering, Vol. 29, Nos. 1-3, pp 63-78, 2009 describes aqueous polyurethanes with amide groups in the hard segments that were made by chain extending the prepolymer with various dicarboxylic acids. The particle size, mechanical and dynamic mechanical properties of cast films along with water swell and adhesion were studied.

WO2011/052707A1 titled Aqueous Polyamide Resin Dispersion, Method for Producing the Same, and Laminate discloses making a solvent dispersible polyamide for laminates.

US 2011/0124799 A1 to E. I. Du Pont de Nemours and Company describes inkjet inks for textiles containing crosslinked polyurethanes and further containing additional reactive components.

EP 449419 A1 describes reacting primary aminoalcohols with acid terminated polyamideethers to create hydroxyl terminated polymers.

SUMMARY OF THE INVENTION

This invention relates to hydrolysis resistant polyurea/urethane polymers useful to make a dispersion in aqueous media comprising urea linkages and/or one or more polyamide segments. The term polyurea/urethane is meant to cover urea linkages and/or urethane linkages in a polymer. The composition may contain small amounts of other polymers and materials either as physical blends or where the other polymers or materials are co-reacted into the polyurea/urethane polymer. The term polyamide oligomer will refer to an oligomer with two or more amide linkages, or sometimes the amount of amide linkages will be specified. A subset of polyamide oligomers will be telechelic polyamides. Telechelic polyamides will be polyamide oligomers with high percentages, or specified percentages, of two or more functional groups of a single chemical type; e.g. two terminal amine groups, meaning either primary, secondary, or mixtures; two terminal carboxyl groups; two terminal hydroxyl groups, again meaning primary, secondary, or mixtures; and two terminal isocyanate groups, meaning aliphatic, aromatic, or mixtures. Reactive amine terminated telechelic polyamides will be telechelic polyamide oligomers where the terminal groups are both amine types, either primary or secondary or mixtures thereof, i.e. excluding tertiary amine groups.

In one embodiment, the polyurea/urethane polymer is colloidally dispersed in water and is the reaction product of a polyisocyanate, defined as a molecule with two or more isocyanate groups, and an amine terminated polyamide oligomer via a urea linkage. In preferred embodiments, the colloidal particles are characterized by their size and the polyamide is further characterized by its composition. In another embodiment, a liquid telechelic prepolymer is described a polyurea/urethane polymer or prepolymer comprised of a reaction product of a polyamide with at least two amide linkages and about two terminal Zerewitinoff groups, Zerewitinoff group being defined as active hydrogen containing groups (such as amine or hydroxyl) that are reactive with isocyanates to form chemical bonds, with a polyisocyanate as described above, optionally with other molecules with Zerewitinoff groups. A small amount of compatible solvent or ethylenically unsaturated monomers (such as free radically polymerizable monomers such as acrylic monomers) may be used to reduce the pre-polymer viscosity to facilitate dispersion in water (functioning as a plasticizer). A water-soluble diamine may be used in the aqueous media to promote chain-extension if an isocyanate terminated prepolymer is present.

DETAILED DESCRIPTION OF THE INVENTION

Definitions

We will use the parentheses to designate 1) that the something is optionally present such that monomer(s) means monomer or monomers or (meth)acrylate means methacrylate or acrylate, 2) to qualify or further define a previously mentioned term, or 3) to list narrower embodiments.

The polyurea/urethane polymers and prepolymers of this disclosure are an extension of polyurethane dispersions by utilizing amide linkages in polyamide segments as macromonomers and urea and/or urethane linkages to connect the amide segments into the polymer or prepolymer. To more clearly express the concepts we will first define conventional polyurethanes. The technology for making and using thermoplastic polyurethanes are well known and described for example in U.S. Pat. No. 6,777,466 B2 and J. K. Backus et al., "Polyurethanes," in: Encyclopedia of Polymer Science and Engineering. Vol. 13, H F. Mark et al., pp. 243-303 (1988). Some polyurethanes in polyurethane dispersions macromonomers of 500-5,000 g/mole molecular weight connected with the residue of diisocyanates or polyisocyanates.

The conventional polyurethanes in polyurethane dispersions are generally linear polymers with soft segments of 500 g/mole to 5,000 g/mole, generally derived from hydroxyl terminated oligomers, also known as macromonomers, linked together with diisocyanates, forming urethane linkages on both ends of the diisocyanate from the reaction of the diisocyanate with the hydroxyl groups of the oligomers. Polyurethane dispersions are typically made by first making a moderate molecular weight prepolymer that is dispersed in an aqueous media as later taught. The prepolymers are generally 5,000 g/mole to 100,000 g/mole. Simultaneous with dispersion or after dispersion, the prepolymers are generally chain extended to become urethane polymers of greater than 100,000 g/mole molecular weight. If one wants to increase the molecular size of the urethane linkages and promote more phase separation between the soft and hard segments, the diisocyanates can be further reacted with low molecular weight diols, e.g. ethylene glycol, propylene glycol, or butylene glycol, to link two diisocyanates into one larger diisocyanate with a two linking urethane linkages and a short alkylene coupling.

In conventional polyurethanes the segments between each urethane linkages provide one or more important property to the polyurethane. If the intended use temperature of the urethane polymer is significantly above the softening temperature, similar to a Tg, of the segments, then the segments will be considered as soft segments and the polymer will likely exhibit elastomeric properties and can be mechanically deformed to a significant extent, e.g. 20-300 or 400% elongation, without breaking, as the soft segment deforms and untangles to accommodate applied stress. The soft segment can provide fracture resistance and flexibility to the polyurethane polymer by preventing glassy low surface area fractures of the hard segments of the polymer.

In conventional polyurethanes the urethane linkages phase, often considered a hard segments because it has a Tg above the intended use temperature, can act as physical crosslinks of the polymer. These urethane segments being somewhat uniformly spaced along the urethane polymer, about every 500-5,000 gram/mole segment of the soft polymer, can, if associated, prevent the ends of each elastomer phase from moving. Thus any stretching, bending, etc. of the polymer is elastically stored and the urethane polymer attempts to retain its original shape after each deformation. The hard urethane segments can also make the polyurethane harder if they are high Tg polymers or present in large amounts relative to the total weight of polyurethane.

The oligomers or macromonomers used to make the polyurethane are usually characterized as the physically weaker portion of the polyurethane in terms of environmental resistance. Segments from aliphatic polyesters tend to be susceptible to chain scission via hydrolysis of the ester linkages. Segments from polyethers tend to have poor UV resistance and can be degraded by the UV in ordinary sunlight. Segments from polycarbonates have better resistance to hydrolysis and UV than polyesters and polyether but are more expensive. Thus polycarbonates are less often used in urethanes than polyethers or polyesters.

A first portion of this invention is the substitution of polyamide segments for polyester, polyether, or polycarbonate segments in a polymer made from isocyanate derived hard segments and the already mentioned macromonomers. The replacement by polyamide segments for polyester, polyether, or polycarbonate segments can be partial or complete. Optimum environmental resistance would result from complete replacement of polyester and polyether segments, due to their potential for easier chain scission, but in some application some of the polyester and or polyether segments could be retained for their ability to soften the elastomeric portion or modify the compatibility of the resulting polymer with other polymer surfaces. When polymer from polyesters or polyether are degraded by hydrolysis or UV activated chain scission the molecular weight of the polymer is decreased such that the polymer (or segment) exhibits decreased tensile strength, elongation to break, resistance to solvents, etc., relative to the same polymer before chain scission. The effect of UV exposure on block copolymers of nylon 6-polyethylene glycol block copolymers is reported in Gauvin, Pascal; Lemaire, Jacques in Makromolekulare Chemie (1987), 188(5), 971-986. In the case of coatings after chain scission the low molecular weight fragments of the polymer are removed by solvents, mild abrasion, and plastic flow leaving the substrate exposed without a coating. In the case of pigmented coatings and inks, chain scission or fracture results in loss of binder and the pigment (without the binder present) is removed by any solvent or mild rubbing or pressure.

A second embodiment of this invention is the substitution of polyurea linkages for some or all of the urethane linkages. Urea linkages are derived from reacting an isocyanate group with a primary or secondary amine. Urethane linkages are derived from reacting an isocyanate group with an oxygen of a hydroxyl group. Urea linkages form hard segments with higher melting temperatures than urethane linkages. Thus, increasing the percentage of urea linkages increases the practical use temperature of a polymer, the temperature where the hard segment, if associated together, are sufficiently rigid such that the polymer does not permanently deform by plastic flow in response to stress.

A second benefit of the first portion of this invention (substituting low Tg polyamide segments for polyether or polyester segments) is that the polyamide segments tend to promote better wetting and adhesion to a variety of polar substrates, such as glass, nylon, and metals than polyester or polyether based polyurethanes. The hydrophobic/hydrophilic nature of the polyamide can be adjusted by using different ratios hydrocarbyl portion to amide linkages in the polyamide. Diacids, diamines, aminocarboxylic acids, and lactams with large carbon to nitrogen ratios tend to be hydrophobic. When the carbon to nitrogen ratio in the polyamide becomes smaller, the polyamide is more hydrophilic.

Thus polymers made from polyamide segments can have good solvent resistance. Solvents can deform and stress a polymer by swelling thereby causing premature failure of the polymer or parts from the polymer. Solvents can cause a coating to swell and delaminate from a substrate at the interface between the two. Adding polyamide to a polymer can increase adhesion to substrates that have similar or compatible surfaces to polyamides.

At this point it would be good to explain that many of the polyamides of the prior art are high melting point crystalline polyamides such as 6-nylon, 6,6-nylon, 6,10-nylon that melt at temperatures much too high, in excess of 100° C., to serve as soft segments if a blocky thermoplastic polymer is desired. In some of the prior art publications the polyamide, often a crystalline or high Tg polyamide type, was added merely to increase the surface interaction with a substrate that was compatible to polyamides. To create a lower Tg polymer soft, low Tg, polyester, polyether or polycarbonates were added to the polyamide segment to provide a lower composite Tg elastomeric segment. In other prior art publications only a few polyamide linkages were inserted into a polymer to modify the polarity of the polymer to increase solvent resistance or raise the softening temperature.

One objective of the current patent application is to use high percentages of amide linkages in a polymer segments incorporated via reaction with polyisocyanates into a copolymer with thermoplastic, optionally elastomeric, properties to provide resistance to chain scission from hydrolysis and UV activated chain scission. Thus many embodiments will describe soft segments with high percentages of total linkages between repeat units in the soft segment being amide linkages. Some embodiments may allow for some linkages between repeat units to be other than amide linkages. In some embodiments the linkages between the polyamide oligomer and the isocyanate groups of the polyisocyanate will have significant portions of urea linkages. Urea linkages tend to have a higher melting temperature than urethane linkages and therefor provide higher use temperatures. Some embodiments may allow for urethane linkages between polyamide oligomers and the isocyanate groups of the polyisocyanate component, when preventing chain scission isn't a top priority.

An important modification from conventional polyamides to get low Tg polyamide soft segments is the use of monomers with secondary amine terminal groups in forming the polyamide. The amide linkage formed from a secondary amine and a carboxylic acid type group is called a tertiary amide linkage. Primary amines react with carboxylic acid type groups to form secondary amides. The nitrogen atom of a secondary amide has an attached hydrogen atom that often hydrogen bonds with a carbonyl group of a nearby amide. The intra-molecular H-bonds induce crystallinity with high melting point and act as crosslinks reducing chain mobility. With tertiary amide groups the hydrogen on the nitrogen of the amide linkage is eliminated along with hydrogen bonding. A tertiary amide linkage that has one additional alkyl group attached to it as compared to a secondary amide group, which has hydrogen attached to it, has reduced polar interactions with nearby amide groups when the polymer exists in a bulk polymer sample. Reduced polar interactions mean that glassy or crystalline phases that include the amide linkage melt at lower temperatures than similar amide groups that are secondary amide groups. One way to source secondary amine reactant, a precursor to tertiary amide linkages, is to substitute the nitrogen atom(s) of the amine containing monomer with an alkyl group. Another way to source a secondary amine reactant is to use a heterocyclic molecule where the nitrogen of the amine is part of the ring structure. Piperazine is a common cyclic diamine where both nitrogens are of the secondary type and part of the heterocyclic ring.

Another modification to reduce the Tg of the polyamide soft segments is to use at least one additional monomer beyond the minimum number of monomers to form the polyamide. Thus for a polyamide formed from a lactam polymerization such as from N-methyl-dodecyl lactam one would include an additional lactam, aminocarboxylic acid, diamine, or dicarboxylic acid in the monomers for the polymerization to change the spacing (among repeat units) between the amide linkages formed by the monomer so that the spacing between the amide linkages in the polyamide is irregular along the backbone, not the same physical dimension. For a polymerization of aminocarboxylic acid one would include additional lactam, aminocarboxylic acid, diamine, or dicarboxylic acid (with different physical length between the primary reactive groups of the monomer) in the monomer blend for the polymerization to change the spacing among repeat units between the amide linkages. Switching end groups on the monomers can also disrupt regularity in the spacing of the polar amide linkages and lower the effective Tg of the copolymer. Thus co-polymerizing a $C_6$ amino carboxylic acid or lactam with a $C_6$ diacid and $C_6$ diamine can disrupt regularity of the amide linkages as the diacid and diamine units would switch the orientation of the amide linkage from head to tail orientation to tail to head orientation, slightly disrupting uniformity of spacing of the amide linkages along the polyamide backbone. Typically, when following this procedure one would try to add a disrupting monomer that increased or decreased the number of atoms between the amide forming end groups of the monomer(s) used as the primary monomer in the polyamide. One could also use a second disrupting monomer that had a cyclic structure (such as piperazine, a cyclic diamine monomer with where two methylene atoms form the top half of the ring and two methylene atoms form the bottom half of the ring) to disrupt the regularity of polyamide formed from a diacid reacted with a diamine monomer with two methylene atoms between the nitrogen atoms of the diamine.

Another way to express the use of a copolymerization method to reduce the Tg and consequently the hardness of the polyamide is that the polyamide is characterized as being within a, b or c a) when said amide linkages are derived from polymerizing one or more monomers and more than 90 mole % of said monomers are derived from polymerizing monomers selected from lactam and aminocarboxylic acid monomer then said polyamide is defined as a copolymer of at least two different monomers, meaning said monomers are characterized as being at least two different monomers because they have hydrocarbyl portion of different spacing length between the amine and carboxylic acid groups, wherein each of said at least two different monomers is present at molar concentrations of at least 10%, more desirably at least 20 or 30%, of the total lactam and/or aminocarboxylic acid monomers in said polyamide, or b) when said amide linkages are derived from polymerizing two or more monomers and more than 90 mole % of said monomers were derived from polymerizing dicarboxylic acid and diamine monomers then said polyamide is defined as a terpolymer of at least three different monomers (meaning said amide linkages are formed from at least three different monomers selected from the group of dicarboxylic acid and diamine monomers wherein said at least three different monomers are characterized as different from each other by a hydrocarbyl group of different spacing length between the carboxylic acid groups of the dicarboxylic acid, or different spacing length between the amine groups of the diamine, wherein each of said at least three different monomers is present at concentrations of at least 10 mole %, more desirably at least 20 or 30 mole %, of the total monomers in said polyamide), or c) with the proviso that if said amide linkages are derived from polymerizing a combination of dicarboxylic acid, diamine and either lactam and/or aminocarboxylic acid monomers such that the total dicarboxylic acid monomer(s) and the diamine monomer(s) are present at 10 mole % or more, more desirably 20 or 30 mole % or more, and the total lactam and aminocarboxylic acid monomers are present in the monomer blend at 10 mole % or more, more desirably 20 or 30 mole % or more, then there are no restrictions requiring additional different monomers.

We use the term low Tg, glass transition temperature, even though we realize most of the polyamide segments are initially low molecular weight and it would not be easily possible to measure the Tg of the low molecular weight oligomers, e.g. the measured value would be dramatically affected by molecular weight. High Tg polymers, e.g. having Tg values above 70, 80, or 90° C. as measured by differential scanning calorimetry (DSC), would tend to form solids or gels even at low molecular weights. Thus the polyamide oligomers, telechelic polyamides, and even the prepolymers from telechelic polyamides or polyamide oligomers are often described in this specification by their viscosity at specific temperatures. Low Tg polyamide oligomers will be defined as those compositions that would have Tg, if above 20,000 g/mole molecular weight, of below 50, 25, or 0° C.

In one embodiment, the telechelic prepolymer will have a viscosity measured by a Brookfield circular disc viscometer with the circular disc spinning at 5 rpm of less than 100,000 cps at a temperature of 70° C., more desirably less than 15,000 or 10,000 cps at 70° C., still more desirably less than 100,000 cps at 60° C., and more preferably less than 15,000 or 10,000 cps at 60° C.; and still more preferable less that 15,000 or 10,000 cps at 50° C. Preferably these viscosities are neat prepolymers without solvents or plasticizers. These types of viscosities will facilitate dispersing the prepolymer as fine droplets in a continuous media to form a colloidally stable dispersion. In some embodiments, the telechelic prepolymer can be diluted with solvent or plasticizers to achieve viscosities in these ranges.

The term polyamide oligomer will refer to an oligomer with two or more amide linkages, or sometimes the amount of amide linkages will be specified. A subset of polyamide oligomers will be telechelic polyamides. Telechelic polyamides will be polyamide oligomers with high percentages, or specified percentages, of two functional groups of a single chemical type, e.g. two terminal amine groups (meaning either primary, secondary, or mixtures), two terminal carboxyl groups, two terminal hydroxyl groups (again meaning primary, secondary, or mixtures), or two terminal isocyanate groups (meaning aliphatic, aromatic, or mixtures). Ranges for the percent difunctional that are preferred to meet the definition of telechelic are at least 70 or 80, more desirably at least 90 or 95 mole % of the oligomers being difunctional as opposed to higher or lower functionality. Reactive amine terminated telechelic polyamides will be telechelic polyamide oligomers where the terminal groups are both amine types, either primary or secondary and mixtures thereof, i.e. excluding tertiary amine groups.

Many of the oligomers, telechelics, and polymers of this specification are made by condensation reactions of reactive groups on desired monomer(s). The condensation reaction of reactive groups will be defined as creating chemical linkages between the monomers. The portion of the monomer that is incorporated into the oligomer or polymer will be defined as the repeat unit from the particular monomer. Some monomers, such as aminocarboxylic acid, or one end of diacid reacting with one end of a diamine, lose one molecule of water as the monomer goes from a monomer to a repeat unit of a polymer. Other monomers, such as lactams, isocyanates, amines reacted with isocyanates, hydroxyl groups reacted with isocyanates, etc. do not release a portion of the molecule to the environment but rather retain all of the monomer in the resulting polymer.

We will define polyamide oligomer as a species below 20,000 g/mole molecular weight, e.g. often below 10,000; 5,000; 2,500; or 2,000 g/mole, that has two or more amide linkages per oligomer. Later we will define preferred percentages of amide linkages or monomers that provide on average one amide linkage per repeat unit in various oligomeric species. A subset of polyamide oligomer will be telechelic oligomer. The telechelic polyamide has molecular weight preferences identical to the polyamide oligomer above. The term telechelic has been earlier defined. Multiple polyamide oligomers or telechelic polyamides can be linked with condensation reactions to form polymers, generally above 100,000 g/mole.

Generally amide linkages are formed from the reaction of a carboxylic acid group with an amine group or the ring opening polymerization of a lactam, e.g. where an amide linkage in a ring structure is converted to an amide linkage in a polymer. In a preferred embodiment, a large portion of the amine groups of the monomers are secondary amine groups or the nitrogen of the lactam is a tertiary amide group. Secondary amine groups form tertiary amide groups when the amine group reacts with carboxylic acid to form an amide. For the purposes of this disclosure the carbonyl group of an amide, e.g. in a lactam, will be considered as derived from a carboxylic acid group because the amide linkage of a lactam is formed from the reaction of carboxylic group of an aminocarboxylic acid with the amine group of the same aminocarboxylic acid. The formation of amides from the reaction of carboxylic acid groups and amine groups can be catalyzed by boric acid, boric acid esters, boranes, phosphorous acid, phosphates, phosphate esters, amines, acids, bases, silicates, and silsesquioxanes. Additional catalysts, conditions, etc. are available in textbooks such as "Comprehensive Organic Transformations" by Larock.

The polyamide oligomers and telechelic polyamides of this disclosure can contain small amounts of ester linkages, ether linkages, urethane linkages, urea linkages, etc. if the additional monomers used to form these linkages are useful to the intended use of the polymers. This allows other monomers and oligomers to be included in the polyamide to provide specific properties, which might be necessary and not achievable with a 100% polyamide segment oligomer. Sometimes added polyether, polyester, or polycarbonate provides softer, e.g. lower Tg, segments. Sometimes it is desirable to convert the carboxylic end groups or primary or secondary amine end groups of a polyamide to other functional end groups capable of condensation polymerizations. Sometimes an initiator for oligomer chain polymerization of a lactam is used that doesn't generate an amide linkage. Sometimes a polyether might be used as a segment or portion of a polyamide to reduce the Tg, or provide a soft segment, of the resulting polyamide oligomer. Sometimes a polyamide segment, e.g. difunctional with carboxylic acid or amine terminal groups, can be functionalized with two polyether end segments, e.g. from Jeffamine™ D230, to further lower the Tg of, or provide a soft segment in, the polyamide oligomer and create a telechelic polyamide with amine or hydroxyl end groups. Sometimes a carboxylic acid terminated telechelic polyamide segment is functionalized by reacting with an aminoalcohol, such as N-methylaminoethanol or $HN(R^\alpha)(R^\beta)$ where $R^\alpha$ is a $C_1$ to $C_4$ alkyl group and $R^\beta$ comprises an alcohol group and a $C_2$ to $C_{12}$ alkylene group, alternatively $R^\alpha$ and $R^\beta$ can be interconnected to form a $C_3$ to $C_{16}$ alkylene group including a cyclic structure and pendant hydroxyl group (such as in 2-hydroxymethyl piperidine), either of which can create a telechelic polyamide with terminal hydroxyl groups. The reaction of the secondary amine (as opposed to the hydroxyl group) with the carboxylic acid can be favored by using a 100% molar excess of the amino alcohol and conducting the reaction at 160° C.+/−10 or 20°. The excess amino alcohol can be removed by distillation after reaction. In one embodiment, a polyamide with a high percentage of tertiary amide linkages, such as at least 80% of said amide linkages being characterized as tertiary amide linkages, is used to make a telechelic prepolymer, characterized as the reaction product of a hydroxyl terminated polyamide with a polyisocyanate and optionally other molecules, where said telechelic polyamide is comprised of one or more repeat units from a lactone of 2 or 4 to 10 carbon atoms and/or a hydroxyl carboxylic acid of 3 to 30 carbon atoms. In one embodiment, said lactone and/or hydroxyl carboxylic acid are added after polymerization of an amine terminated polyamide and are reacted with said amine terminated polyamide to convert it to a hydroxyl terminated polyamide by being the terminal repeat unit(s) on one or both ends of said telechelic polyamide.

As earlier indicated many amide forming monomers create on average one amide linkage per repeat unit. These include diacids and diamines when reacted with each other, aminocarboxylic acids, and lactams. When we discuss these monomers or repeat units from these monomers we generally mean these monomers, their repeat units and their reactive equivalents (meaning monomers that generate the same repeat unit as the named monomer). These reactive equivalents might include anhydride of diacids, esters of diacids, etc. These monomers, when reacted with other monomers in the same group, also create amide linkages at both ends of the repeat units formed. Thus we will use both mole percentages of amide linkages and weight percentages of amide forming monomers. Amide forming monomers will be used to refer to monomers that form on average one amide linkage per repeat unit in normal amide forming condensation linking reactions.

In one embodiment, desirably at least 10 mole %, more desirable at least 25, 30, 45, 50, 55, more desirably at least 60, 70, 75, 76, 80, 90, or 95 mole % of the number of the heteroatom containing linkages connecting hydrocarbon type linkages in the polyamide oligomer or telechelic polyamide are characterized as being amide linkages. Heteroatom linkages are linkages such as amide, ester, urethane, urea, ether linkages, where a heteroatom connects two portions of an oligomer or polymer that are generally characterized as hydrocarbons (or having carbon to carbon bond, such as hydrocarbon linkages). As the amount of amide linkages in the polyamide increase the amount of repeat units from amide forming monomers in the polyamide increases.

In one embodiment, desirably at least 25 wt. %, more desirable at least 30, 40, 50, more desirably at least 60, 70, 80, 90, or 95 wt. % of the polyamide oligomer or telechelic polyamide is repeat units from amide forming monomers, also identified as repeat units from monomers that form amide linkages at both ends of the repeat unit. Such monomers include lactams, aminocarboxylic acids, dicarboxylic acid and diamines. In one embodiment, desirably at least 25 wt. %, more desirable at least 30, 40, or 50, more desirably at least 60, 70, 80, 90, or 95 wt. % of the polyamide oligomer or telechelic polyamide is tertiary amide forming monomers, also identified as repeat units from monomers that form tertiary amide linkages at the amine ends of the repeat unit. Such monomers include lactams with tertiary amide groups, aminocarboxylic acids with secondary amine groups, dicarboxylic acid and diamines where both amine terminal groups are secondary amines.

In one embodiment, desirably at least 50, 75, 76, 80, 90, or 95 mole percent of the number of the heteroatom containing linkages connecting hydrocarbon type linkages in the polyamide oligomer or telechelic polyamide are characterized as being tertiary amide linkages. In one embodiment, desirably at least 25, 50, 75, 76, 80, 90, or 95 mole percent of the linkages in the polyamide oligomer or telechelic polyamine are tertiary amide linkages. As earlier explained tertiary amide linkages result from ring opening polymerization of lactams with tertiary amides or reactions of secondary amines with carboxylic acid groups.

Calculation of Tertiary Amide Linkage %:
The % of tertiary amide linkages of the total number of amide linkages was calculated with the following equation:

$$\text{Tertiary amide linkage \%} = \frac{\sum_{i=1}^{n}(w_{tertN,i} \times n_i)}{\sum_{i=1}^{n}(w_{totalN,i} \times n_i)} \times 100$$

where n is the number of monomers,
the index i refers to a certain monomer,
$w_{tertN}$ is the average number nitrogen atoms in a monomer that form or are part of tertiary amide linkages in the polymerizations, (note: end-group forming amines do not form amide groups during the polymerizations and their amounts are excluded from $w_{tertN}$),
$w_{totalN}$ is the average number nitrogen atoms in a monomer that form or are part of tertiary amide linkages in the polymerizations (note: the end-group forming amines do not form amide groups during the polymerizations and their amounts are excluded from $w_{totalN}$), and $n_i$ is the number of moles of the monomer with the index i.
Calculation of Amide Linkage %:
The % of amide linkages of the total number of all heteroatom containing linkages (connecting hydrocarbon linkages) was calculated by the following equation:

$$\text{Amide linkage } \% = \frac{\sum_{i=1}^{n}(w_{totalN,i} \times n_i)}{\sum_{i=1}^{n}(w_{totalS,i} \times n_i)} \times 100$$

where $w_{totalS}$ is the sum of the average number of heteroatom containing linkages (connecting hydrocarbon linkages) in a monomer and the number of heteroatom containing linkages (connecting hydrocarbon linkages) forming from that monomer polymerizations. "Hydrocarbon linkages" are just the hydrocarbon portion of each repeat unit formed from continuous carbon to carbon bonds (i.e. without heteroatoms such as nitrogen or oxygen) in a repeat unit. This hydrocarbon portion would be the ethylene or propylene portion of ethylene oxide or propylene oxide; the undecyl group of dodecyllactam, the ethylene group of ethylenediamine, and the $(CH_2)_4$ (or butylene) group of adipic acid.

Preferred amide or tertiary amide forming monomers include dicarboxylic acids, diamines, aminocarboxylic acids and lactams. Preferred dicarboxylic acids are where the alkylene portion of the dicarboxylic acid is a cyclic, linear, or branched (optionally including aromatic groups) alkylene of 2 to 36 carbon atoms, optionally including up to 1 heteroatom per 3 or 10 carbon atoms, more preferably from 4 to 36 carbon atoms (the diacid would include 2 more carbon atoms than the alkylene portion). These include dimer fatty acids, hydrogenated dimer acid, sebacic acid, etc. Generally, we prefer diacids with larger alkylene groups as this generally provides polyamide repeat units with lower Tg value.

Preferred diamines include those with up to 60 carbon atoms, optionally including 1 heteroatom (besides the two nitrogen atoms) for each 3 or 10 carbon atoms of the diamine and optionally including a variety of cyclic, aromatic or heterocyclic groups providing that one or both of the amine groups are secondary amines, a preferred formula is

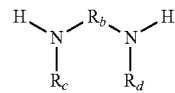

wherein $R_b$ is a direct bond or a linear or branched (optionally being or including cyclic, heterocyclic, or aromatic portion(s)) alkylene group (optionally containing up to 1 or 3 heteroatoms per 10 carbon atoms of the diamine) of 2 to 36 carbon atoms and more preferably 2 or 4 to 12 carbon atoms and $R_c$ and $R_d$ are individually a linear or branched alkyl group of 1 to 8 carbon atoms, more preferably 1 or 2 to 4 carbon atoms or $R_c$ and $R_d$ connect together to form a single linear or branched alkylene group of 1 to 8 carbon atoms or optionally with one of $R_c$ and $R_d$ is connected to $R_b$ at a carbon atom, more desirably $R_c$ and $R_d$ being 1 or 2 to 4 carbon atoms. Such diamines include Ethacure™ 90 from Albermarle (supposedly a N,N'-bis(1,2,2-trimethylpropyl)-1,6-hexanediamine); Clearlink™ 1000 or Jefflink™ 754 both from Huntsman; N-methylaminoethanol; dihydroxy terminated, hydroxyl and amine terminated or diamine terminated poly(alkyleneoxide) where the alkylene has from 2 to 4 carbon atoms and having molecular weights from 100 to 2000; N,N'-diisopropyl-1,6-hexanediamine; N,N'-di(sec-butyl)phenylenediamine; piperazine; homopiperazine; and methyl-piperazine. Jefflink™754 has the structure

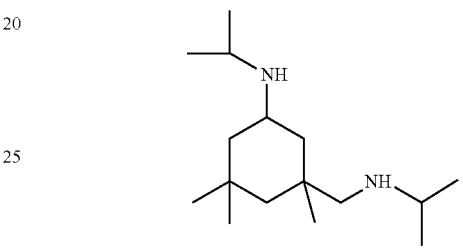

Clearlink™ 1000 has the structure

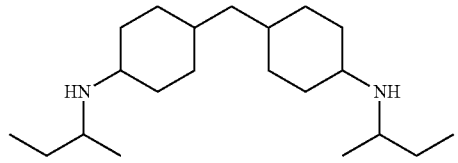 [SMILES: CCC(C)NC1CCC(CC2CCC(NC(C)CC)CC2)CC1]

Another diamine with an aromatic group is: N,N'-di(sec-butyl)phenylenediamine, see structure below:

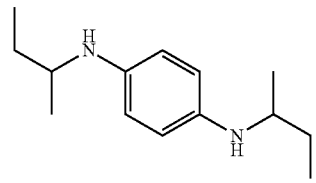 [SMILES: CCC(C)Nc1ccc(NC(C)CC)cc1]

Preferred diamines are diamines wherein both amine groups are secondary amines.

Preferred lactams include straight chain or branched alkylene segments therein of 4 to 12 carbon atoms such that the ring structure, without substituents on the nitrogen of the lactam, has 5 to 13 carbon atoms total (when one includes the carbonyl) and the substituent on the nitrogen of the lactam (if the lactam is a tertiary amide) is an alkyl of from 1 to 8 carbon atoms and more desirably an alkyl of 1 to 4 carbon atoms. Dodecyl lactam, alkyl substituted dodecyl lactam, caprolactam, alkyl substituted caprolactam, and other lactams with larger alkylene groups are preferred lactams as they provide repeat units with lower Tg values. Aminocarboxylic acids have the same number of carbon atoms as the lactams. Desirably the number of carbon atoms in the linear or branched alkylene group between the amine and carboxylic acid group of the aminocarboxylic acid is from 4 to 12 and the substituent on the nitrogen of the amine group (if it is a secondary amine group) is an alkyl group with from 1 to 8 carbon atoms, more preferably 1 or 2 to 4 carbon atoms. Aminocarboxylic acids with secondary amine groups are preferred.

In one embodiment, desirably at least 50 wt. %, more desirably at least 60, 70, 80 or 90 wt. % of said polyamide oligomer or telechelic polyamide comprise repeat units from diacids and diamines of the structure of the repeat unit being

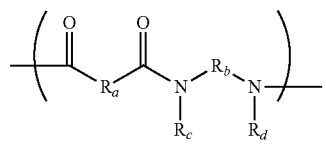

wherein $R_a$ is the alkylene portion of the dicarboxylic acid and is a cyclic, linear, or branched (optionally including aromatic groups) alkylene of 2 to 36 carbon atoms, optionally including up to 1 heteroatom per 3 or 10 carbon atoms of the diacid, more preferably from 4 to 36 carbon atoms (the diacid would include 2 more carbon atoms than the alkylene portion) and wherein $R_b$ is a direct bond or a linear or branched (optionally being or including cyclic, heterocyclic, or aromatic portion(s)) alkylene group (optionally containing up to 1 or 3 heteroatoms per 10 carbon atoms) of 2 to 36 or 60 carbon atoms and more preferably 2 or 4 to 12 carbon atoms and $R_c$ and $R_d$ are individually a linear or branched alkyl group of 1 to 8 carbon atoms, more preferably 1 or 2 to 4 carbon atoms or $R_c$ and $R_d$ connect together to form a single linear or branched alkylene group of 1 to 8 carbon atoms or optionally with one of $R_e$ and $R_d$ is connected to $R_b$ at a carbon atom, more desirably $R_e$ and $R_d$ being an alkyl group of 1 or 2 to 4 carbon atoms.

In one embodiment, desirably at least 50 wt. %, more desirably at least 60, 70, 80 or 90 wt. % of said polyamide oligomer or telechelic polyamide comprise repeat unit units from lactams or amino carboxylic acids of the structure

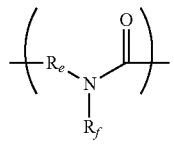

Repeat units can be in a variety of orientations depending on initiator type in the oligomer, derived from lactams or amino carboxylic acid wherein each $R_e$ independently is linear or branched alkylene of 4 to 12 carbon atoms and each $R_f$ independently is a linear or branched alkyl of 1 to 8 (more desirably 1 to 4) carbon atoms.

The above described polyamide oligomers and telechelic polyamide are useful to make prepolymers by reacting the polyamide oligomer or telechelic polyamide with polyisocyanates. Polyisocyanates will be used in this specification to refer to isocyanate containing species having two or more isocyanates groups per molecule. Desirably the polyamide oligomers and telechelic polyamide have terminal groups reactive with isocyanates to form urea linkages and/or urethane linkages. Groups chemically reactive with isocyanates to form chemical linkages are known as Zerewitnoff groups and include primary and secondary amines and primary and secondary alcohols. The nitrogen of the primary or secondary amine bonds to a carbonyl of the isocyanate and a hydrogen from the primary or secondary amine moves from the amine and bonds to the NH group of the isocyanate. The oxygen of a primary or secondary alcohol bonds to the carbonyl of the isocyanate and a hydrogen from the hydroxyl group of the alcohol moves and bonds to the NH group of the isocyanate.

During the reaction of the polyamide oligomers or telechelic polyamides with the polyisocyanates, one can have other species present with Zerewitinoff groups to co-react into the resulting polymer network. These can be low molecular weight species (say less than 500 g/mole diols or diamines) or higher molecular weight species (say 500 to 5000 g/mole oligomers that are added to form the high or low Tg phases in the resulting polymer). Generally if one wants to make a polymer dispersion in water, one only reacts the components with a stoichiometry imbalance between the reactive groups to create moderate molecular weight species called a prepolymer with the functional group present in excess being the dominant terminus of most prepolymer units. This is usually accomplished by keeping the stoichiometry of the isocyanate groups to Zerewitinoff groups away from the 1:1 ratio (such that isocyanate or Zerewitinoff group terminated prepolymers of limited molecular weight are produced). The molecular weight of the prepolymer is kept fairly low (5000 g/mole to 100,000 g/mole) so that the prepolymer is a liquid at room temperature or slightly above room temperature (generally up to about 80° C.). This facilitates mixing of the prepolymer and dispersing of the prepolymer as small colloidally stable particles in water without the viscosity of the prepolymer interfering. Often an excess of isocyanate groups are used so that the prepolymer is isocyanate terminated.

The molecular weight of the prepolymer can be increased (or it is sometimes referred to as chain extending the prepolymer into a urethane polymer) after the dispersion of prepolymer is made. This can be done by adding to the dispersion low molecular weight species such as diols, triols, tetrols, or diamines, triamines or tetraamines that can react with isocyanate terminated prepolymers linking them into higher molecular weight species. Isocyanate groups on the prepolymer can also react with water in the continuous to generate $CO_2$ gas and terminal amine groups on some of the prepolymer. The amine groups on some of the prepolymer can then react with isocyanate groups on other prepolymers and chain extend both species. While the following paragraphs describe dispersing groups that can be incorporated into the prepolymer/polymer, it is also possible to utilize dispersants and surfactants of the anionic, cationic, nonionic, or zwitterionic type or mixtures thereof to facilitate the dispersion of the prepolymer/polymer in a continuous media.

Dispersing species such as anionic, cationic, nonionic, or zwitterionic species are desirably added to the prepolymer (or polymer) if it is desired to disperse the prepolymer (or polymer) in a continuous aqueous phase. These dispersing species help to provide colloidal stabilization to the dispersed phase. If surface active dispersing groups are to be incorporated into the polymer, it is desirable to include them in the reaction of the polyamide oligomer or telechelic polyamide (e.g. during the prepolymer preparation). Dispersing groups that have Zerewitinoff active groups, which react with isocyanate groups to form urea or urethane linkages, are particularly preferred for this purpose.

Polyureas and polyurethanes made from polyamide oligomers or telechelic polyamides are generally hydrophobic and not inherently water-dispersible. Therefore, at least one water-dispersability enhancing compound, i.e. a monomer with a dispersing functionality, which has at least one, hydrophilic, ionic or potentially ionic group is optionally included in the reactants for the polyurea or polyurethane polymers and prepolymers of this invention to assist dispersion of the polymer/prepolymer in water. Typically, this is done by incorporating a compound bearing at least one hydrophilic group or a group that can be made hydrophilic, e.g., by chemical modifications such as neutralization, into the polymer/prepolymer chain. These compounds may be of a nonionic, anionic, cationic or zwitterionic nature or the combination thereof. For example, anionic groups such as carboxylic acid groups can be incorporated into the prepolymer and subsequently ionized by a salt-forming compound, such as a tertiary amine defined more fully hereinafter. Anionically dispersible prepolymers/polymers based on carboxylic acid groups generally have an acid number from about 1 to about 60 mgKOH/gram, typically 1 to about 40, or even 10 to 35 or 12 to 30 or 14 to 25 mg KOH/gram. Other water-dispersibility enhancing compounds can also be reacted into the prepolymer backbone through urethane linkages or urea linkages, including lateral or terminal hydrophilic ethylene oxide or ureido units.

Water dispersability enhancing compounds of particular interest are those which can incorporate weak carboxyl groups into the prepolymer. Normally, they are derived from hydroxy-carboxylic acids having the general formula $(HO)_xQ(COOH)_y$, wherein Q is a straight or branched hydrocarbon radical containing 1 to 12 carbon atoms, and x and y are 1 to 3. Examples of such hydroxy-carboxylic acids include dimethylol propanoic acid, dimethylol butanoic acid, citric acid, tartaric acid, glycolic acid, lactic acid, malic acid, dihydroxymalic acid, dihydroxytartaric acid, and the like, and mixtures thereof. Dihydroxy-carboxylic acids are more preferred with dimethylol propanoic acid and dimethylol butanoic acid being most preferred.

Another group of water-dispersability enhancing compounds of particular interest are side chain hydrophilic monomers. Some examples include alkylene oxide polymers and copolymers in which the alkylene oxide groups have from 2-10 carbon atoms as shown, for example, in U.S. Pat. No. 6,897,281, the disclosure of which is incorporated herein by reference.

Water dispersability enhancing compounds can impart cationic nature onto polyurethane. Cationic polyurethanes contain cationic centers built into or attached to the backbone. Such cationic centers include ammonium, phosphonium and sulfonium groups. These groups can be polymerized into the backbone in the ionic form or, optionally, they can be generated by post-neutralization or post-quaternization of corresponding nitrogen, phosphorous, or sulfur moieties. The combination of all of the above groups can be used as well as their combination with nonionic stabilization. Examples of amines include N-methyldiethanol amine and aminoalcohols available from Huntsman under Jeffcat® trade name such as DPA, ZF-10, Z-110, ZR-50 and alike. They can make salts with virtually any acid. Examples of acid include hydrochloric, sulfuric, acetic, phosphoric, nitric, perchloric, citric, tartaric, chloroacetic, acrylic, methacrylic, itaconic, maleic acids, 2-carboxyethyl acrylate and other. Quaternizing agents include methyl chloride, ethyl chloride, alkyl halides, benzyl chloride, methyl bromide, ethyl bromide, benzyl bromide, dimethyl sulfate, diethyl sulfate, chloroacetic, acids and alike. Examples of quaternized diols include dimethyldiethanolammonium chloride and N,N-dimethyl-bis(hydroxyethyl) quaternary ammonium methane sulfonate. Cationic nature can be imparted by other post-polymerization reactions such as, for example, reaction of epoxy quaternary ammonium compounds with carboxylic group of dimethylol propanoic acid.

Other suitable water-dispersability enhancing compounds include thioglycolic acid, 2,6-dihydroxybenzoic acid, sulfoisophthalic acid, polyethylene glycol, and the like, and mixtures thereof.

Although the use of water-dispersability enhancing compounds is preferred, dispersions of the present inventions can be prepared without them by using high-shear dispersing methods and stabilizing by surfactants.

(i) Polyisocyanate

Suitable polyisocyanates have an average of about two or more isocyanate groups, preferably an average of about two to about four isocyanate groups per molecule and include aliphatic, cycloaliphatic, araliphatic, aromatic, and heterocyclic polyisocyanates, as well as products of their oligomerization, used alone or in mixtures of two or more. Diisocyanates are more preferred.

Specific examples of suitable aliphatic polyisocyanates include alpha, omega-alkylene diisocyanates having from 5 to 20 carbon atoms, such as hexamethylene-1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, and the like. Polyisocyanates having fewer than 5 carbon atoms can be used but are less preferred because of their high volatility and toxicity. Preferred aliphatic polyisocyanates include hexamethylene-1,6-diisocyanate, 2,2,4-trimethyl-hexamethylene-diisocyanate, and 2,4,4-trimethyl-hexamethylene diisocyanate.

Specific examples of suitable cycloaliphatic polyisocyanates include dicyclohexylmethane diisocyanate, (commercially available as Desmodur™ W from Bayer Corporation), isophorone diisocyanate, 1,4-cyclohexane diisocyanate, 1,3-bis-(isocyanatomethyl) cyclohexane, and the like. Preferred cycloaliphatic polyisocyanates include dicyclohexylmethane diisocyanate and isophorone diisocyanate.

Specific examples of suitable araliphatic polyisocyanates include m-tetramethyl xylylene diisocyanate, p-tetramethyl xylylene diisocyanate, 1,4-xylylene diisocyanate, 1,3-xylylene diisocyanate, and the like. A preferred araliphatic polyisocyanate is tetramethyl xylylene diisocyanate.

Examples of suitable aromatic polyisocyanates include 4,4'-diphenylmethylene diisocyanate, toluene diisocyanate, their isomers, naphthalene diisocyanate, and the like. Preferred aromatic polyisocyanates include 4,4'-diphenylmethylene diisocyanate and toluene diisocyanate.

Examples of suitable heterocyclic isocyanates include 5,5'-methylenebisfurfuryl isocyanate and 5,5'-isopropylidenebisfurfuryl isocyanate.

Polyamide-based polyurea/urethane compositions were made in waterborne dispersion form with high molecular weight, e.g. Mw>80 000 g/mol, high solid content, e.g. 25-40 wt. %, various particle size, e.g. 40-200 nm. The dispersions were made with NMP, N-methylpyrrolidone, solvent, e.g. 0-11% in formulation, or with solvent process (NMP-free method) using IPA.

Good quality, clear, colorless (or very faint yellow color) polyurea and or polyurethane with polyamide segment in the form of films formed from the dispersion. The films had high tensile strength, e.g. 35,000-55,000 psi, moderate elongation, e.g. 250-300%, films.

We made a series of polyamide oligomers from conventional difunctional acids and amines. These oligomers contained amine terminations and in reaction with diisocyanates form polyamide-polyurea backbone. The polyamide building blocks in our new dispersion polymers provide excellent hydrolytic stability, superior heat and UV resistance, and better overall mechanical properties in comparison to polyester and polyether segments. In addition, the amine chain termination in these polyamide oligomers forms urea linkages (vs. urethane link from polyol) in reaction with isocyanates. These polyurea linkages are known to have stronger intermolecular attractions that act more like a true crosslinked polymer, resulting in performance advantages over urethanes, including but not limited to better solvent resistance and elasticity.

Conventional Blends with Other Polymers

The dispersions of this invention can be combined with compatible polymers and polymer dispersions by methods well known to those skilled in the art. Such polymers, polymer solutions, and dispersions include those described in A. S. Teot. "Resins, Water-Soluble" in: Kirk-Othmer Encyclopedia of Chemical Technology. John Wiley & Sons. 3rd Edn., Vol. 20, H. F. Mark et al. Eds., pp. 207-230 (1982).

Composite Polymer Compositions (e.g. Polyurea/Urethane with Free Radically Polymerizable Monomers) Providing Better Interpenetration of Phases In this embodiment, one can use ethylenically unsaturated monomer(s) as a solvent to reduce the viscosity of the prepolymer during preparation and dispersion of the prepolymer or polyurea/urethane and subsequently polymerize the unsaturated monomer(s) to form a polymer. Ethylenically unsaturated monomers and other free radically polymerizable monomers can be polymerized by conventional free radical sources to form a polymer within the polyurea/urethane particle to form a composite polymer with the polyurea/urethane polyamide of the dispersion. Vinyl polymers is a generic term for polymers derived from substantial portions of unsaturated monomers or polymers derived from those monomers. Acrylic, often considered a subset of vinyl, will refer to acrylic acid, acrylates, being esters of acrylic acid, and alkacrylates, such as methacrylates and ethacrylates, and polymers therefrom. Additional free-radically polymerizable material, e.g. other unsaturated monomers, may be added to the vinyl or acrylic monomers to copolymerize. These other monomers can be monomers such as maleic anhydride, maleic acid, and other monomers where the carbon-carbon double bond is nearly as reactive (and copolymerizable with) as a ethylenically unsaturated monomers. Dienes are considered ethylenically unsaturated and copolymerize with both the broad category of vinyl monomers and narrow category of acrylic monomers.

The polymerization within the polyurethane particles can be done by forming the aqueous dispersions of polyurea/urethane composite and then polymerizing additional monomers by emulsion or suspension polymerization in the presence of these dispersions. Another way of making composite polymers is to include ethylenically unsaturated monomers in the polyurea/urethane prepolymer, e.g. either with the reactants to form the prepolymer and/or any time before the urethane prepolymer is dispersed, and cause these monomer to polymerize before, during and/or after the prepolymer is dispersed in aqueous medium. In one embodiment, the weight percent of polymer(s) from vinyl monomers based on 100 parts of combined urea/urethane and vinyl (or acrylic in narrower embodiments) will be at least 1, 5, or 10 weight percent with the complementary amount of urea/urethane prepolymer or polymer to make 100 parts by weight total. In another embodiment, where small amounts of urea/urethane prepolymer or polymer are desired, the urea/urethane prepolymer or polymer is at least 0.1, 0.5, 1, 5 or 10 weight percent of the combined weight and the vinyl (or acrylic in narrower embodiments) polymer is the complementary amount.

In one approach, the ethylenically unsaturated monomers act as a diluent (or plasticizer) during prepolymer formation. When the vinyl monomers are used as a diluent for the polyurea/urethane component then the vinyl monomers will be from about 5 or 10 weight percent to about 50 weight percent of the combined weight of the polyurea/urethane and vinyl component (monomer or polymer, depending on whether polymerization has occurred or not). Composites of polyurea/urethanes of this invention with and acrylics can be made by any of these approaches. In one embodiment the telechelic polyamides with alcohol terminal groups are useful to form polyurethanes and polyurethane dispersions in water with lower processing temperatures and lower minimum film formation temperatures than similar polymer dispersions where secondary amino groups are in the position of the terminal hydroxyl groups. These can result in better films or the ability to incorporate more polyamide in a polymer dispersion or higher melting polyamide in a polymer dispersion. It is desirable that these alcohol terminal groups are derived from reacting aminoalchohols having secondary amino groups with carboxylic acid terminated polyamides as described in paragraph 0040. This is because the secondary amino groups form urea linkages with di or polyisocyanates and hydroxyl groups for urethane linkages with di or polyisocyanates. Urea linkages result in polymers that require higher processing temperatures and have higher minimum film formation temperatures than urethane linkages in similar polymers.

Broadened Definition of Composite and/or Hybrid Polymer in Dispersion in Water

As composite and/or hybrid polymers dispersed in aqueous media (water) with significant amounts of polyamide segments therein have not be extensively disclosed in the literature and said composite and/or hybrid polymers can have desirable lower film formation temperature, better adhesion to some polar substrates, better elongation to break, better tensile strength, better retention of properties after aging, etc. than current urethane and/or polyamide compositions on the market. Composites and/or hybrid compositions can allow one to adjust the weight percentage of polyamide repeat units relative to other repeat units (e.g. optionally polyether, polycarbonate, polyester segments, polysiloxane, etc.) in the condensation polymer to optimize the modulus at a particular temperature or to move the minimum film formation temperature up or down by adding softer or harder polymer segments relative to the polyamide. Condensation polymer is a generic term for polymers made by coupling reactive groups like amine, carboxylic acid, isocyanates, hydroxyl, etc. in to form chemical bonds (as opposed to free radical chain polymerizations). Composite and/or hybrid compositions also allow adjustment of the weight percentage of polyamide by increasing the weight percentage of vinyl polymer without increasing the amount of polyamide. Thus this technology provides several ways to independently control the amount of polyamide in the composite particles, which can have effects on the polarity or hydrogen bonding of the composite particles, the surface tension of the composite particles, and/or the modulus, tensile strength, etc. of the composite polymer at a particular key temperature.

By the term composite and/or hybrid we intend to include a variety of mixtures of other polymers with a polyamide rich polymer type. A focus of this disclosure is ways to add polyamide segments to a polymer dispersion in water such that desirably features of polyamide can be achieved without some detrimental features such as high polymer processing temperatures. The polymers that contain polyamide segments may have other comonomers or comonomer segments linked directly or indirectly to the polyamide segments. These comonomers can include things like polyethers, polyesters, polycarbonates, polysiloxanes, etc. The composite and/or hybrid polymers of the composite and/or hybrid dispersions have approximately the same particle size ranges as disclosed for the polyamide dispersions in water.

The composite and/or hybrid polymer dispersions may have within the polymer comprising polyamide segments anionic, nonionic, or zwitterionic colloidal stabilizing groups as earlier disclosed for the polyamide dispersions in water.

In one embodiment, we disclose a composite and/or hybrid polymer dispersion in the form of dispersed hybrid polymer particles in aqueous medium, said composite and/or hybrid polymer dispersion comprising at least 5 wt. % (in some embodiments more desirably at least 10, 15, 20, 30 or 40 wt. %) of polyamide segments derived from amide forming condensation polymerization of monomers selected from diamines, amino carboxylic acids, lactams, and dicarboxylic acids, said wt. % based on the weight of said hybrid polymer dispersion in aqueous medium, said polyamide segments characterized as the entire weight of repeat units from said monomers having terminal amide linkage(s) at one or both ends of repeat units from said monomers. In a more preferred embodiment said amide linkages are characterized as being at least 50, 70, 90, or 95 mole % amides linkages of the type formed from the reaction of a secondary amine with a carboxylic acid (i.e. a tertiary amide linkage). We note that lactam monomers forming tertiary amide linkages start out as tertiary amide linkages, ring open, and then form polymers with tertiary amide linkages. We intend the above language regard amide linkage of the type formed from secondary amines reacted with carboxylic acid to include those derived from lactams with tertiary amide linkages.

The composite particles also comprise at least 5 wt. % (in some embodiments more desirably at least 10, 15, 20, 30 or 40 wt. %) of a vinyl polymer interspersed with said polyamide segments within the same polymer particles as said polyamide segments, wherein said vinyl polymer is derived from the free radical polymerization of one or more vinyl monomers in the presence of said polyamide segments (vinyl monomers being defined in this context as having at least alpha-beta unsaturation and desirably having from 3 to about 30 carbon atoms, including but not limited to (alk) acrylates, vinyl esters, unsaturated amides, acrylonitrile, dienes, styrene, AMPs monomer, etc.), and water. The water can be present in amounts from about 10, 20, or 30 weight percent of the polymer dispersion to about 70, 80, or 90 wt. % of the polymer dispersion. Typically lower water content saves on shipping costs for the same amount of polymer but viscosity of the dispersions tend to rise when the water content is minimized.

In one embodiment, it is desirable that the polymer containing the polyamide segments be partially crosslinked to increase the physical properties of the polymer such as tensile strength and modulus. In one embodiment, the amount of ketone crosslinkable functional groups in the composite or hybrid polymer will be at least 0.05 milliequivalents per gram of said polymer dispersion, or up to about 1 milliequivalent, preferably from about 0.05 to about 0.5 milliequivalent, and more preferably from about 0.1 to about 0.3 milliequivalent per gram of said polymer dispersion. In that embodiment the ketone groups can be on the polyamide containing polymer or the vinyl polymer. In another embodiment, said composite or hybrid polymer dispersion has at least 10, 20, 30, 40 or 50 wt. % of said polyamide segments chemically bonded into polymers comprising on average one or more ketone groups per said polymer. In another embodiment said polymer dispersion further comprises hydrazine and/or hydrazide groups (sometimes in the form of low molecular weight species and sometimes in the form of polymers with hydrazide groups) in an amount from 10 mole % to about 200 mole % of hydrazine and/or hydrazide groups based on the moles of said ketone groups. This provides for a ketone chemical reaction with hydrazine forming a chemical bond that can function as chemical crosslinking Typically, when adding hydrazine for crosslinking one doesn't use an excess of hydrazine because of potential undesirable reactions of hydrazine on humans. In one embodiment the amount of hydrazine or hydrazide groups is desirably from about 20 to 100 mole % of the amount of ketone functional groups.

In one embodiment, said hydrazine and/or hydrazide groups are part of a reactive hydrazine or hydrazide compound of less than 400, 300 or 220 g/mole molecular weight (such as adipic acid dihydrazide). In another embodiment, said hydrazide groups are present and said hydrazide groups are part of a hydrazide reactive oligomeric or polymeric chemical compound of 300 or 400 g/mole to 500,000 g/mole molecular weight.

In another embodiment, said vinyl polymer comprises on average one or more (more desirably up to about 1 milliequivalent, preferably from about 0.05 to about 0.5 milliequivalent, and more preferably from about 0.1 to about 0.3 milliequivalent per gram of vinyl polymer on a dry vinyl polymer weight basis) ketone groups per vinyl polymer and said dispersion further comprises hydrazine and/or hydrazide groups in an amount from 10 mole % to about 200 mole % based on the moles of said ketone groups.

The ketone-hydrazine crosslinking described above is well known in the urethane and acrylic polymer dispersion art as effective crosslinkers for polymeric dispersions at around room temperature upon evaporation of volatile base and shift of the solution pH from slightly basic to neutral or pH acid. The author Anthony D. Pajerski has several patents on urethanes and related compounds in water crosslinked or increased in molecular weight by ketone-hydrazine crosslinking. This technology is also sometimes known as azomethine linkages.

Air-oxidizable, self-crosslinkable (unsaturation) crosslinkers can also be conveyed into the polymer of the composite or hybrid dispersion. The self-crosslinkable groups can be inserted into the polymer backbone via active hydrogen containing (isocyanate-reactive) unsaturated fatty acid ester polyol(s) (e.g., oil modified polyols). The resulting unsaturation in the polymer imparts air curable latent crosslinkability so that when a coating composition containing such a component is dried in the air (often in conjunction with a drier salt) the coating undergoes a self-crosslinking reaction. By isocyanate reactive is meant that the unsaturated fatty acid polyol contains at least two hydroxyl groups (containing active hydrogen atoms) that are available for reaction with the isocyanate groups on the polyisocyanate. The oil modified polyols employed in the invention are conventional in the art. They are generally produced by reacting a polyfunctional alcohol (polyol) with a drying oil (glyceride) or a free fatty acid. The fatty acid component(s) of the drying oils and free fatty acids are characterized by containing at least one olefinic carbon-carbon double bond and can have two, three or more olefinic double bonds. The amount of unsaturated fatty acid ester polyol (or drying oil) to utilize will depend on many factors such as the degree of flexibility desired in the final composition and the nature and the amount of the other reactants used in the prepolymer formation as well as the degree and rate of air curing that is desired for the polymer.

Unsaturated fatty acid ester polyols also can be obtained by reacting an unsaturated fatty acid with an epoxy group containing compound. In one aspect of the invention the polyfunctional alcohols which can be used to prepare the oil modified polyols generally contain from 2 to about 12 carbon atoms. In another aspect of the invention, polyfunctional acids and acid anhydrides can be reacted with polyfunctional alcohols to obtain polyester polyols for use as a polyfunctional alcohol. Such acids and anhydrides useful in this aspect of the invention generally contain from 4 to about 36 carbon atoms. The unsaturated fatty acids which can be utilized in the preparation of the oil modified polyols of the invention include the ethylenically unsaturated and polyunsaturated fatty acids and their esters. The fatty acids can contain from 1 to about 3 olefinic double bonds or more and include conjugated and non-conjugated unsaturation. It is intended that the fatty acids encompass and include all natural and synthetic positional isomers with respect to the location of the unsaturated carbon-carbon double bonds. In another aspect of the invention, the fatty acids contain two to three unsaturated double bonds. The unsaturated fatty acids that can be employed in preparing the oil modified polyol include but are not limited to those formed by the hydrolysis of any of the so called drying or semidrying oils, such as linseed oil, poppyseed oil, tung oil, etc. Synthetically modified unsaturated fatty acids also can be employed in the preparation of the unsaturated fatty acid ester polyols of the invention. The properties of unsaturated fatty acids and their derivatives can be altered by rearrangement, i.e., isomerization, of the structure of the double bond, either with respect to the steric position or the position in the carbon chain of the molecule of the fatty acid.

The composite and/or hybrid polymer dispersion may further comprise from about 0.5 to about 10 wt. % of $C_1$ or $C_3$ to $C_{12}$ secondary alcohols based on the weight of said dispersion to function as simple hydrogen bonding donating components to the polyamide segments and soften or plasticize the composition (to enhance film formation at lower temperatures or lower viscosity during the dispersion process). The composite and/or hybrid polymer dispersion may also comprise alkylene oxide glycol ethers of less than 300 or 400 g/mole molecular weight in amounts of about 0.5 to about 10 wt. % of the polymer dispersion. The composite and/or hybrid polymer dispersion may also comprise anionic, nonionic, or zwitterionic surfactants to help colloidally stabilize the dispersion.

The composite and/or hybrid polymer dispersion may further comprising from about 1 to about 10 wt. % of a polysiloxane chemically bonded directly or indirectly to one or more of said polyamide segments. Polysiloxane polyols are characterized by the presence of the —Si($R_1$)($R_2$)—O— repeat units which can contain $C_1$-$C_3$-alkyl or aryl groups such as polydimethylsiloxanes, poly(dimethysiloxane-co-diphenylsiloxane)s, polydiphenylsiloxanes, poly(methylphenyl)siloxanes and the like, and combinations thereof. Examples include ethoxylated poly(dimethylsiloxane) (PDMS) Y-17256 from Momentive Performance Materials and side-chain PDMS diol MCR-C61 from Gelest.

A composite and/or hybrid polymer dispersion according to earlier disclosures may further comprise urea and/or urethane linkages bonded directly or indirectly to one or more of said polyamide segments. This uses the polyamide segment (wherein a majority of amide linkages tertiary amide linkages as previously discussed) and the segments of polyamide are sometimes or often linked with urethane or urea linkages derived from reacting polyisocyanates with hydroxyl and/or amine groups. Thus the polyamide segments would be chain extended by urethane or urea linkages. In one embodiment, where amine (primary or secondary) reactive groups are reacted with isocyanate groups, there are on average at least 4 urea linkages per every 20 amide linkages in said polymer. In another embodiment, where urethane linkages are preferred and made from reaction of hydroxyl terminated segments with isocyanate groups, there are on average at least 4 urethane linkages per every 20 amide linkages in said polyamide segments.

Processes

Aqueous dispersions of polyurea/urethane particles are made in accordance with this invention by forming the polyurea/urethane prepolymer in the substantial absence of water (as water reacts with isocyanate groups) and then dispersing this prepolymer in aqueous medium. This can be done in any of the methods known to the art. Typically, prepolymer formation will be done by bulk or solution polymerizing the ingredients of the prepolymer.

Once the polyurea/urethane prepolymer mixture is formed, optionally with dispersing moieties incorporated into said prepolymer/polymer, it is dispersed in an aqueous medium to form a dispersion or a solution. Dispersing the prepolymer in aqueous medium can be done by any conventional technique in the same way that polyurethane prepolymers made by bulk or solution polymerization are dispersed in water. Normally, this will be done by combining the prepolymer blend with water with mixing. Where solvent polymerization is employed, the solvent and other volatile components can optionally be distilled off from the final dispersion, if desired. Where the prepolymer includes enough water-dispersibility enhancing compound, e.g. anionic, cationic, and/or nonionic monomers, to form a stable dispersion without added emulsifiers (surfactants), the dispersion can be made without such compounds, i.e., substantially free of surfactants, if desired. The advantage of this approach is that the coatings or other products made from the polyurea/urethane without low molecular weight surfactants exhibit less water sensitivity, often better film formation and less foaming.

Other known ways of making aqueous polyurethane dispersions can also be used to make the dispersions of this invention. Their review can be found in several publications including by D. Dieterich in *Progress in Organic Coatings*, vol. 9, pp. 281-340 (1981). Examples of the processes include:

Shear Mixing—Dispersing the prepolymer by shear forces with emulsifiers (external emulsifiers, such as surfactants, or internal emulsifiers having anionic, nonionic, cationic and/or zwitterionic groups as part of or pendant to the polymer backbone, and/or as end groups on the polymer backbone).

Acetone process—A prepolymer is formed with or without the presence of acetone, MEK, and/or other polar solvents that are non-reactive with isocyanates and easily distilled. The prepolymer is further diluted in said solvents as necessary, and chain extended with an active hydrogen-containing compound. Water is added to the chain-extended polymer, and the solvents are distilled off. A variation on this process would be to chain extend the prepolymer after its dispersion into water.

Melt dispersion process—An isocyanate-terminated prepolymer is formed, and then reacted with an excess of ammonia or urea to form a low molecular weight oligomer having terminal urea or biuret groups. This oligomer is dispersed in water and chain extended by methylolation of the biuret groups with formaldehyde.

Ketazine and ketimine processes—Hydrazines or diamines are reacted with ketones to form ketazines or ketimines. These are added to a prepolymer, and remain inert to the isocyanate. As the prepolymer is dispersed in water, the hydrazine or diamine is liberated, and chain extension takes place as the dispersion is taking place.

Continuous process polymerization—An isocyanate-terminated prepolymer is formed. This prepolymer is pumped through high shear mixing head(s) and dispersed into water and then chain extended at said mixing head(s), or dispersed and chain extended simultaneously at said mixing head(s). This is accomplished by multiple streams consisting of prepolymer (or neutralized prepolymer), optional neutralizing agent, water, and optional chain extender and/or surfactant.

Reverse feed process—Water and optional neutralizing agent(s) and/or extender amine(s) are charged to the prepolymer under agitation. The prepolymer can be neutralized before water and/or diamine chain extender is added.

Additives and Applications

Because the polyamide and the urea linkages have higher softening temperatures than polyethers, polyesters, and urethane linkages, it is desirable to include coalescing aids in the prepolymers and polymer dispersions of this disclosure to help promote coalescence at the desired temperature of the polymer particles with each other and with any solid additives in the compositions. Coalescing aids can also be known as solvents or plasticizers, depending on their function. One coalescing aid is the vinyl monomers earlier discussed with composite polymer blends. Preferred vinyl monomers include methyl methacrylate, butyl acrylate, ethylhexyl acrylate, ethyl acrylate and styrene. Coalescing solvents include diethylene glycol dimethyl ether, dipropylene glycol dimethyl ether, dimethylcarbonate, isopropyl alcohol, dibutylene glycol dimethyl ether, and Texanol (isobutyric ester of 2,2,4-trimethyl-1,3-pentanediol).

Neutralization agents can optionally be employed in the dispersions of the invention and the coating compositions prepared from such dispersions. The pH of the compositions can range from about 7 to about 10. Suitable neutralization agents include but are not limited to alkali hydroxides such as lithium, sodium and potassium, and organic bases such as ammonia and tertiary amines such as triethanolamine, aminomethyl propanol, dimethyl ethanol amine, trimethyl amine, triethylamine morpholine, and mixtures thereof.

Crosslinkers

Compounds having at least one crosslinkable functional group can also be incorporated into the polyurea/urethane of the present invention, if desired. Examples of such compounds include those having carboxylic, carbonyl, amine, hydroxyl, epoxy, acetoacetoxy, olefinic and hydrazide groups, blocked isocyanates, and the like, and mixtures of such groups and the same groups in protected forms which can be reversed back into original groups from which they were derived. Other suitable compounds providing crosslinkability include thioglycolic acid, 2,6-dihydroxybenzoic acid, melamine and its derivatives, multivalent metal compounds and the like, and mixtures thereof.

The amount of optional compounds having crosslinkable functional groups in the prepolymer will typically be up to about 1 milli-equivalent, preferably from about 0.05 to about 0.5 milli-equivalent, and more preferably from about 0.1 to about 0.3 milli-equivalent per gram of final polyurethane on a dry weight basis.

Other additives well known to those skilled in the art can be used to aid in preparation of the dispersions of this invention. Such additives include surfactants, stabilizers, defoamers, thickeners, leveling agents, antimicrobial agents, antioxidants, UV absorbers, fire retardants, pigments, dyes, and the like. These additives can be added at any stage of the manufacturing process.

The dispersions of this invention typically have total solids of at least about 20 weight percent in one aspect, at least about 30 weight percent in another aspect, and at least about 40 weight percent in a further aspect, and about 45 weight percent in still another aspect, based on the weight of the total coating composition.

As coating compositions or adhesives, they may be applied to any substrate including wood, metals, glass, cloth, leather, paper, plastics, foam and the like, by any conventional method including brushing, dipping, flow coating, spraying, and the like.

The compositions of the present invention and their formulations are useful as self-supporting films, coatings on various substrates, or adhesives with longer useful lifetimes than similar polyurethane compositions or other improved properties.

Working Examples

In these examples, the following reagents were used:
H12MDI—1,1'-methylenebis-(4-isocyanato cyclohexane) from Bayer Corporation as Desmodur® W.
IPDI—isophorone diisocyanate from Bayer Corporation.
Tegomer® D-3403—trimethylolpropane monoethoxylate methyl ether (Mn=1,220 g/mol) from Evonik.
Jeffamine-D230: di-primary amine-terminated polypropyleneglycol, Mn=230 g/mol. PC-4672 is a polycarbonate of about 2000 g/mole molecular weight that is a copolymer of hexanediol and butanediol carbonate with alcohol chain ends.
Catalyst (DBTL) is di-n-butyl tin dilaurate
Santisizer™-148 plasticizer: isodecyl diphenyl phosphate available from Ferro.
VeoVa™ 10: vinyl ester of versatic acid available from Momentive, where versatic acid is HO—C(=O)$(R_1)(R_2)$ where $R_1$ and $R_2$ are (branched) alkyl groups of 7 carbon atoms.
tBHPO: is tertiary butyl hydroperoxides
ErA (+TEA): is erythorbic acid and some triethanolamine
Fe$(EDTA)_2$ is iron complexed with ethylenediaminetetraacetic acid
Y14209 is a bis-hydroxy-terminated polydimethylsiloxane, Mn=1650 g/mole from Momentive
IBOZ is isobornyl acrylate
BHT is butylated hydroxytoluene
EC-90: Ethacure-90, N,N'-di(3,3-dimethylbutan-2-yl) hexanediamine, see structure below:

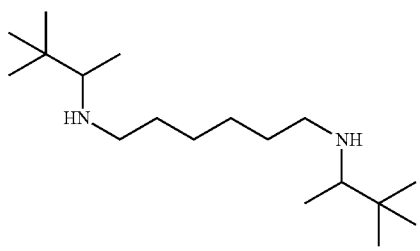 [SMILES: CC(NCCCCCCNC(C)C(C)(C)C)C(C)(C)C]

Polyamide A
All diacids, piperazine (quantity: sum of "blocks" and "diamines" in the recipe) and the water were charged to the reactor under $N_2$ atmosphere. The reactor was heated to 100° C. and the water was evaporated. Heating was continued to 170° C. and this temperature was maintained for 3 h. The pressure of the reactor was decreased to 1-30 mbar and the reaction was continued for an additional 10 h. The product was a slightly yellowish paste at room temperature with an acid number <3.0 mg KOH/g polymer. The end-groups were secondary amines.

Polyamide B
All diacids, EC-90 and the boric acid were charged to the reactor under $N_2$ atmosphere. The reactor was heated to 250° C. and maintained at that temperature for 5 h. The reactor was cooled to 130° C. and the piperazine was charged (quantity: sum of "blocks" and "diamines" in the recipe). The reactor was heated to 170° C. and the polymer was formed for 2 h at atmospheric pressure. The pressure of the reactor was decreased to 1-30 mbar and the reaction was continued for an additional 10 h. The product was a slightly yellowish paste at room temperature with an acid number <3.0 mg KOH/g polymer. The end-groups were secondary amines.

Polyamide C
All diacids, piperazine, homopiperazine, 2-methylpiperazine and the water were charged to the reactor under $N_2$ atmosphere. The reactor was heated to 100° C. and the water was evaporated. Heating was continued to 180° C. and this temperature was maintained for 3 h. The reactor was cooled to 130° C. and the ethylenediamine was charged. The reactor was heated to 170° C. and the polymer was formed for 2 h at atmospheric pressure. The pressure of the reactor was decreased to 1-30 mbar and the reaction was continued for an additional 10 h. The product was a slightly yellowish paste at room temperature with an acid number <3.0 mg KOH/g polymer. The end-groups were primary amines.

Polyamide D
All diacids, piperazine and the water were charged to the reactor under $N_2$ atmosphere. The reactor was heated to 100° C. and the water was evaporated. Heating was continued to 180° C. and this temperature was maintained for 3 h. The reactor was cooled to 130° C. and the Jeffamine-D230 was charged to the reactor. The reactor was heated to 170° C. and the polymer was formed for 2 h at atmospheric pressure. The pressure of the reactor was decreased to 1-30 mbar and the reaction was continued for an additional 10 h. The product was a slightly yellowish paste at room temperature with an acid number <3.0 mg KOH/g polymer. The end-groups were primary amines.

Polyamide E
All diacids, EC-90 and the boric acid were charged to the reactor under N2 atmosphere. It was heated to 250° C. and maintained at that temperature for 5 h. The reactor was cooled to 130° C. and the piperazine (quantity: sum of "blocks" and "diamines" in the recipe) was charged to the reactor. The reactor was heated to 170° C. and the polymer was formed for 4 h at atmospheric pressure. The reactor was cooled to 130° C. and ethylenediamine (5% of the weight of the charge) was added to the reactor to push the reaction to completion. The temperature was increased to 170° C. and the reaction was continued for 3 h. The pressure of the reactor was decreased to 1-30 mbar and the reaction was continued for an additional 1 h. The product was a slightly yellowish paste at room temperature with an acid number <3.0. The end-groups were a mixture of secondary and primary amines.

TABLE 1

Polyamide oligomers used in polyurea/urethane prepolymers

| | Polyamide | | | | |
|---|---|---|---|---|---|
| | Polyamide A | Polyamide B | Polyamide C | Polyamide D | Polyamide E |
| Mn g/mole | 920 | 1700 | 1780 | 1650 | — |
| Sebacic acid g | 271.5 | 202.6 | 142.6 | 94.8 | 212.0 |
| Dodecane-dioic acid g | 162.4 | 109.5 | 74.2 | — | 147.8 |
| Hydrogenated dimer acid g | 387.3 | 694.9 | 647.3 | 584.9 | 1017.7 |
| Piperazine g | 278.1 | 270.0 | 72.9 | 72.9 | 169.5 |
| Monomer 5 g | — | EC-90 Mw 274 103.6 | Homo-piperazine 26.3 | Jeffamine D 230 Mn 230 302.6 | EC-90 Mw 274 55.6 |
| Monomer 6 g | — | — | Methyl-piperazine 55.6 | — | Piperazine end blocks 225.3 |
| Monomer 7 g | — | — | Ethylene-diamine 60.1 | — | — |
| Catalyst g | — | Boric acid 1.3 | — | — | Boric acid 1.7 |
| Water g | 350 | — | 350 | 400 | 105 |
| Terminal | Diamine secondary | Diamine secondary | Diamine primary | Diamine primary | Diamine secondary |
| Tg | −17.3° C. | −14.0° C. | −13° C. | −20° C. | −44° C. |
| Viscosity | 26,000 cps @60° C. | 55,000 cps @70° C. | — | 21,000 @ 55° C. | 5000 cps @55° C. |
| Tertiary amide linkages % | 100 | 100 | 77 | 56 | 70 |

TABLE 1-continued

Polyamide oligomers used in polyurea/urethane prepolymers

| | Polyamide | | | | |
|---|---|---|---|---|---|
| | Polyamide A | Polyamide B | Polyamide C | Polyamide D | Polyamide E |
| Amide linkages % | 100 | 100 | 100 | 43 | 49 |

TABLE 2

Polyurea/urethane Dispersions

| | PUD # | | | | |
|---|---|---|---|---|---|
| | I | II | III | IV | V |
| Polyamide (PA) | A | B | C | D | E |
| Poly(amide) g | 494.8 | 198.2 | 189.2 | 212.6 | 35.8 |
| Dimethyl-carbonate g | 85.8 | 14.8 | 19.6 | — | 5.6 |
| Dimethylol-butanoic acid g | 42.9 | 14.8 | 9.8 | 18.7 | 2.86 |
| Des W g | 346.3 | — | 78.5 | 117.2 | 22.88 |
| HDI g | — | 66.5 | — | — | — |
| Methyl methacrylate g | — | — | — | — | 24.5 |
| Butyl acrylate g | — | — | — | — | 10.5 |
| Isopropyl alcohol g | 250 + 248 | 64.2 | 140 + 154.8 | — | — |
| Acetone g | — | 100 | — | — | — |
| Triethylamine g | 43.91 | 20.1 | 8.7 | 14.1 | 3.51 |
| Water g | 2700 | 1080 | 1100 | 1100 | 176 |
| Hexanediamine g | — | 8.3 | — | — | — |
| Hydrazine g | 14.25 | — | 3.885 | 2.05 | — |
| Total solids | 38.1 | 20.5 | 30.3 | 29.2 | 100 |
| Particle size nm | 160 | 139 | — | 48 | 197 |
| pH | 8.5 | 7.3 | 8.2 | 8.2 | 7.8 |

Example PUD # I

Dimethylolbutanoic acid (42.9 g) and dimethylcarbonate (solvent) (85.8 g) were weighed into a reactor, the reactor was heated to 90° C. and stirred until the dimethylolbutanoic completely dissolved. The reactor was cooled to 70° C. and Des W (346.3 g) was added during stirring and cooling. The reactor temperature was maintained at 55° C. for 1.5 h or until the theoretical NCO % was reached. The mixture was cooled to 24 or 25° C. and 250 g isopropanol was added. The solution was further cooled to 10° C. The isopropanol solution of a polyamide (743 g, solid content: 66.6 wt. %, Mn=920 g/mol; polyamide A: amine-terminated copolymer of sebacic acid, dodecanedioic acid, hydrogenated dimer acid and piperazine) was charged to the reactor during cooling. The polyamides were allowed to react with the isocyanates for 15 minutes. Then triethylamine (43.91 g) was added and the prepared prepolymer was dispersed into water (2700 g). The dispersion was chain extended with hydrazine (40.7 g, 35% solution in water) in 15 minutes. The solvents were evaporated at reduced pressure at 50-55° C. The product was a white waterborne polyurea/urethane dispersion.

Example PUD # II

Dimethylolbutanoic acid (14.8 g) and dimethylcarbonate (14.8 g) were weighed into a reactor, the reactor was heated to 90° C. and stirred until the dimethylolbutanoic completely dissolved. The reactor was cooled to 70° C. and HDI (66.5 g) was added during stirring and cooling. The reactor temperature was maintained at 50° C. for 1.5 h or until the theoretical NCO % was reached. The mixture was cooled to 24 or 25° C. and 100 g isopropanol was added. The solution was further cooled to 10° C. The isopropanol solution of a polyamide (262 g, solid content: 75.5 wt. %, Mn=1700 g/mol; polyamide B: amine-terminated copolymer of sebacic acid, dodecanedioic acid, hydrogenated dimer acid, EC-90 and piperazine) was charged to the reactor during cooling. The polyamides were allowed to react with the isocyanates for 15 minutes. Then triethylamine (20.1 g) and acetone (100 g) were added and the prepared prepolymer was dispersed into water (1080 g). The dispersion was chain extended with hexanediamine (16.6 g, 50% solution in acetone) in 15 minutes. The solvents were evaporated at reduced pressure at 50-55° C. The product was a white waterborne polyurea/urethane dispersion.

Example PUD III

Dimethylolbutanoic acid (9.8 g) and dimethylcarbonate (19.6 g) were weighed into a reactor, the reactor was heated to 90° C. and stirred until the dimethylolbutanoic acid completely dissolved. The reactor was cooled to 70° C. and Des W (78.5 g) was added during stirring and cooling. The reactor temperature was maintained at 55° C. for 1.5 h or until the theoretical NCO % was reached. The mixture was cooled to 24 or 25° C. and 140 g isopropanol was added. The solution was further cooled to 10° C. The isopropanol solution of a polyamide (344 g, solid content: 55 wt. %, Mn=1780 g/mol; polyamide C: amine-terminated copolymer of sebacic acid, dodecanedioic acid, hydrogenated dimer acid, methylpiperazine, homopiperazine, ethylenediamine and piperazine) was charged to the reactor during cooling. The polyamides were allowed to react with the isocyanates for 15 minutes. Then triethylamine (8.7 g) was added and the prepared prepolymer was dispersed into water (1100 g). The dispersion was chain extended with hydrazine (11.1 g, 35% solution in water) over 15 minutes. The solvents were evaporated at reduced pressure at 50-55° C. The product was a white waterborne polyurea/urethane dispersion.

Example PUD # IV

Dimethylolbutanoic (18.7 g), NMP (88.5 g), a polyamide (212.6 g, Mn=1530 g/mol; polyamide D: amine-terminated copolymer of sebacic acid, hydrogenated dimer acid, Jeffamine-D (Mn=250 g/mol) and piperazine) were weighed into a reactor, the reactor was heated to 90° C. and stirred until the dimethylolbutanoic completely dissolved. The reactor was cooled to 70° C., DBTL (70 mg) and Des W (117.2 g) were added. The reactor temperature was maintained at 90° C. for 1.5 h or until the theoretical NCO % was reached then triethylamine (14.1 g) was added at 70° C. The prepolymer was cooled to 55° C. and it was dispersed into RT water (1100 g). The dispersion was chain extended with hydrazine (5.8 g, 35% solution in water) in 15 minutes. The product was a white waterborne polyurea/urethane dispersion.

Example V Composite Polyurea/Urethane (Meth)Acrylate

Dimethylolbutanoic acid (2.86 g) and dimethylcarbonate (5.6 g) were weighed into a reactor, the reactor was heated to 90° C. and stirred until the dimethylolbutanoic acid was completely dissolved. The reactor was cooled to 70° C. and Des W (g) was added during stirring and cooling. The reactor temperature was maintained at 55° C. for 1.5 h or until the theoretical NCO % was reached. The mixture was cooled to 24 or 25° C. and 10.5 g butyl acrylate was added. A methyl methacrylate solution of a polyamide (60.3 g, solid content: polyamide E, 59.3 wt. %, Mn=g/mol); was charged to the reactor during cooling. The polyamides were allowed to react with the isocyanates for 15 minutes. Then triethylamine (3.51 g) was added and the prepared prepolymer, the temperature was set to 50° C. and the prepolymer was dispersed into water (176 g). The dispersion was chain extended with piperazine (3.51 g) in 15 minutes. Then the (meth)acrylates were polymerized at 50° C. for 1.5 h in the presence of 0.05 mg FeEDTA, 60 mg t-butylperoxide and 40 mg of erythorbic acid. The product was a white waterborne acrylic polyurethane dispersion.
Additional Polyamides

Example F, Amine Terminated Polyamide from Sebacic Acid, Dodecadioic Acid, Hydrogenated Dimer Acid, Ethacure-90, and Piperazine Sebacic acid, dodecadioic acid, hydrogenated dimer acid, boric acid and Ethacure-90 was measured into the reactor. Under $N_2$ atmosphere the temperature was increased to 250° C. during stirring. The components were reacted at 250° C. for 5 h (hour) while water distilled out of the reactor as a result of the amide formation. The reactor was cooled to 130° C. and piperazine was charged. The reactor was then heated to 150° C. for 1 h, to 180° C. for 1 h. Dipropyleneglycol dimethylether was charged to the reactor and the temperature was increased to 240° C. The monomers were polymerized for 8 hours at atmospheric pressure then vacuum was applied for 1 h.

Example G, Hydroxyl Terminated Polyamide from Hydrogenated Dimer Acid, Piperazine, and Caprolactone Hydrogenated dimer acid and piperazine were charged. The reactor was then heated to 150° C. for 1 h, and to 180° C. for 1 h. Dipropyleneglycol dimethylether was charged to the reactor and the temperature was increased to 240° C. The monomers were polymerized for 8 hours at atmospheric pressure then the temperature was decreased to 180° C. Caprolactone was charged and reacted at 180° C. for 6 h at atmospheric pressure, then vacuum was applied at 180° C. for 1 h.

Example H, Hydroxyl Terminated Polyamide from Dimer Acid, Piperazine and Caprolactone Hydrogenated dimer acid and piperazine were charged. The reactor was then heated to 150° C. for 1 h, and to 180° C. for 1 h. Dipropyleneglycol dimethylether was charged to the reactor and the temperature was increased to 240° C. The monomers were polymerized for 8 h hours at atmospheric pressure then the temperature was decreased to 180° C. Caprolactone was charged and reacted at 180° C. for 6 h at atmospheric pressure, then vacuum was applied at 180° C. for 1 h.

Example I, Hydroxyl Terminated Polyamide from Hydrogenated Dimer Acid, Sebacic Acid, Piperazine, and Caprolactone Hydrogenated dimer acid, sebacic acid and piperazine were charged. The reactor was then heated to 150° C. for 1 h, and to 180° C. for 1 h. Dipropyleneglycol dimethylether was charged to the reactor and the temperature was increased to 240° C. The monomers were polymerized for 8 h hours at atmospheric pressure then the temperature was decreased to 180° C. Caprolactone was charged and reacted at 180° C. for 6 h at atmospheric pressure, then vacuum was applied at 180° C. for 1 h.

Ketone Diol Synthesis, this is made by reacting about 1 mole of Bisphenol A diglycidyl ether with about 2 moles of levulinic acid with about 1.25 mole % of triphenylphosphine catalyst based on the moles of Bisphenol A diglycidyl ether for about 3 hour at 100-120 C under a nitrogen atmosphere (desirably the acid number attributable to the levulinic acid goes below 0.9 mgKOH/g of reactant). Excess Bisphenol A diglycidyl ether can be added if the acid number isn't achieved and the reaction time continued. The acid group of the levulinic acid opens the glycidyl rings and generates a secondary hydroxyl group at the opened ring and the carbonyl of the acid group is chemically attached to a carbon atom of the glycidyl ring. Then about 4 mole percent of IPDI is added (based on the moles of Bisphenol A diglycidyl ether) to couple about 8 mole percent of the Bisphenol A diglycidyl ether. The reaction between the reaction product of levulinic acid and Bisphenol A diglycidyl ether can normally be achieved in about 0.5 hours at 85-90° C. in a low moisture environment or until less than 0.1% of the isocyanate groups remain.

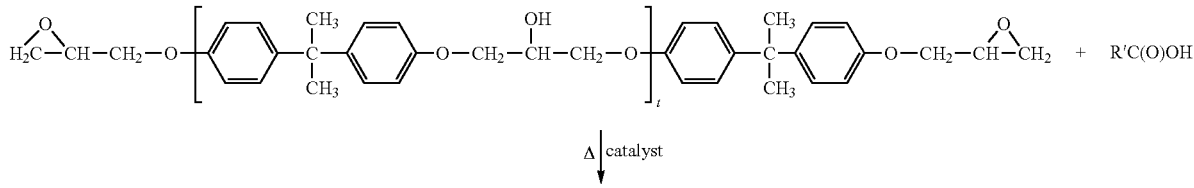

-continued

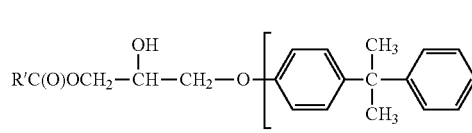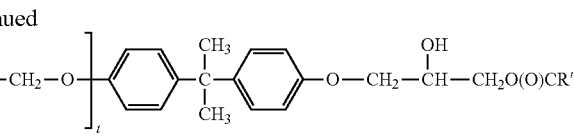

where R'C(O)OH is levulinic acid, t is about 0 and R' contains carbon, hydrogen and the ketone group of levulinic acid.

Dispersions

Hybrid PUD VI (using Polyamide Ex. F) Polyamide with added DMBA dispersing group, dissolved in acrylates, dispersed in aqueous media and chain extended with hydrazine. Then acrylates were free radically polymerized.

Dimethylolbutanoic acid, the polyamide F and the plasticizer(s) were weighed into a premix reactor, the reactor was heated to 90° C. and stirred until the dimethylolbutanoic acid was completely dissolved. Then all methacrylates were added to the premix reactor. All isocyanates and acrylates were charged to the prepolymer reactor and the premix was charged in 5-10 min to the prepolymer reactor. The reactor temperature was set to 90° C. and kept at that temperature until the theoretical NCO % was reached. Then the temperature was changed to 70° C. and triethylamine was added, then cooled further to 55° C. and then the prepolymer was dispersed into water. The dispersion was chain extended with the chain extender in 15 minutes. Then the (meth) acrylates were polymerized at 50° C. for 1.5 h in the presence of FeEDTA, t-butylperoxide and erythorbic acid. The product was a white waterborne acrylic polyurethane dispersion.

Hybrid PUD VII (using Polyamide Ex. G) Hydroxyl terminated polyamide, other polyols, and DMBA dispersing group coupled with aliphatic polyisocyanate; dissolved in acrylates and styrene, dispersed in aqueous media, and chain extended with hydrazine. Then acrylates and styrene were polymerized.

All polyols, dimethylolbutanoic acid and the Ketone diol were charged to the prepolymer reactor and the dimethylolbutanoic acid was dissolved in the polymer melt at 90° C. Then all methacrylates were charged to the reactor and followed by the isocyanates and the acrylates, styrene and the catalyst. The reactor temperature was set to 90° C. and kept at that temperature until the theoretical NCO % was reached. Then the temperature was changed to 70° C. and triethylamine was added, then cooled further to 55° C. and the prepolymer was dispersed into water. The dispersion was chain extended with the chain extender in 15 minutes. Then the (meth)acrylates were polymerized at 50° C. for 1.5 h in the presence of FeEDTA, t-butylperoxide and erythorbic acid. Finally, adipic dihydrazide was added. The product was a white waterborne acrylic polyurethane dispersion.

Hybrid PUD VIII (using Polyamide Ex. H) Polyamide Ex. H, polycarbonate diol, Ketone Diol, dimethylolbutanoic acid, and HMDI were mixed with the vinyl monomers and the isocyanates and the polyols were reacted with the isocyanates to form a prepolymer with the vinyl monomers acting as solvents. The prepolymer was dispersed in water, chain extended and the vinyl monomers were polymerized.

All polyols, dimethylolbutanoic acid and the Ketone Diol were charged to the prepolymer reactor and the dimethylolbutanoic acid was dissolved in the polymer melt at 90° C. Then all methacrylates were charged to the reactor, followed by the isocyanates and the acrylates, styrene and the isocyanate catalyst. The reactor temperature was set to 90° C. and kept at that temperature until the theoretical NCO % was reached. Then the temperature was changed to 70° C. and triethylamine and acrylonitrile was added, then it was cooled to 55° C. and the prepolymer was dispersed into water. The dispersion was chain extended with the chain extender in 15 minutes. Then the vinyl monomers were polymerized at 50° C. for 1.5 h in the presence of FeEDTA, t-butylperoxide and erythorbic acid. Finally, adipic dihydrazide was added. The product was a white waterborne acrylic polyurethane dispersion.

Hybrid PUD IX (using Polyamide Ex. I) Polyamide, ketone diol, polydimethylsiloxane diol, dimethylolbutanoic acid, and the IPDI were reacted to form a prepolymer. The prepolymer along with vinyl monomers were dispersed in the water phase. The prepolymer was chain extended with 3.3 g of ethylenediamine.

The polyamide, polyols, and dimethylolbutanoic acid, and some of the non-crosslinking vinyl monomers and an butylated hydroxytoluene antioxidant were heated to about 80 C to homogenize the dimethylolbutanoic acid. The reactants were cooled to 70-75 C before adding the IPDI. The reactants were then heated to 90-96° C. to form the prepolymer. The prepolymer was cooled to 65-70° C. and the triethylamine was added along with the crosslinking monomers (diacetone acrylamide and hexanediol dimethyacrylate). The prepolymer (about 55-65° C.) was then dispersed in water (about 20-25° C.). Then some hydrazine and ethylenediamine were added to chain extend the prepolymer. Then the vinyl monomers were polymerized at 45° C. for 1.25 h in the presence of FeEDTA, t-butylperoxide and erythorbic acid (note the FeEDTA and BHPO were first allowed to polymerize for 45 minutes and then a second dose of BHPO and erythorbic acid was added and the polymerization was continued another 30 minutes.

TABLE 3

| | Polyamides F, G, H, and I | | | |
|---|---|---|---|---|
| | Example F [g] | Example G [g] | Example H [g] | Example I [g] |
| Hydrogenated Dimer acid | 535.7 | 775.65 | 775.7 | 632.9 |
| Sebacic acid | 173.1 | | | 70.8 |
| Dodecadioic acid | 84.4 | | | |
| Piperazine | 210.6 | 160.29 | 160.3 | 187.4 |
| Caprolactone | | 114.10 | 114.1 | 163.0 |
| Dipropyleneglycol-dimethylether | 10.5 | 10.5 | 10.5 | 10.5 |
| Ethacure-90 | 75.3 | | | |
| Boric acid (amide catalyst) | 1.0 | | | |

TABLE 4

Dispersions VI, VII, VIII, and IX

| | Dispersion name | | | |
|---|---|---|---|---|
| | Example VI | Example VII | Example VIII | Example IX |
| Polyols/polyamines | | | | |
| Polyamide name | Example F | Example G | Example H | Example I |
| Polyamide quantity | 413.00 g | 256.65 | 292.50 | 68.53 |
| Other polyol name | | PC-4672 | PC-4672 | Y-14209 |
| Other polyol quantity | | 132.75 | 90.00 | 11.88 |
| Ketone Diol | | 53.10 | 67.50 | 17.42 |
| trimethylolpropane | | | | 1.34 |
| dimethylolbutanoic acid | 31.48 | 37.70 | 35.72 | 11.90 |
| Isocyanates | | | | |
| HMDI | 240.53 | 255.21 | 249.97 | 72.82 |
| IPDI | | | | |
| Catalyst (DBTL) | | 0.045 | 0.045 | |
| triethylamine | 25.78 | 38.59 | 26.81 | 9.29 |
| Butylated hydroxytoluene | | | | |
| Plasticizer/solvent | | | | |
| Santisizer-148 | 40.00 | | | |
| isopropanol | 30.30 | | | |
| Water | 1918 | 1565.9 | 1446.6 | 552 |
| Hydrazine (35% in | 43.4 | 41.69 | 40.90 | ? |
| Ethylenediamine | | | | 3.3 |
| Vinyl monomers | | | | |
| Methyl methacrylate | 144.00 | | 62.50 | |
| Butyl methacrylate | | | 50.00 | |
| Isobornyl methacrylate | | 37.50 | | 129.60 |
| Butyl acrylate | 129.60 | 75.00 | | |
| hexanedioldimethacrylate | 14.40 | 12.50 | 25.00 | 4.00 |
| Styrene | | 125.00 | 100.00 | |
| Acrylonitrile | | | 12.50 | |
| Viova 10 | | | | 53.20 |
| Diacetoneacrylamide | | | | 11.16 |
| tBHPO 4 wt % or 17.5 | 12.50 | 12.50 | 12.50 | 2.74 |
| ErA (+TEA) 2 wt % or 5 | 12.50 | 12.50 | 12.50 | 2.30 |
| Fe(EDTA)$_2$ *drops* 1 wt % | | 15.00 drops | 7.50 drops | 11 drops |
| Adipic dihydrazide | | 10.41 | 11.34 | |

Each of the documents referred to above is incorporated herein by reference. Except in the Examples, or where otherwise indicated, all numerical quantities in this description specifying amounts, reaction conditions, molecular weights, number of carbon atoms, etc., are to be understood as modified by the word "about." Unless otherwise indicated, all percent and formulation values are on a molar basis. Unless otherwise indicated, all molecular weights are number average molecular weights. Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent, which may be customarily present in the commercial material, unless otherwise indicated. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration. All of the embodiments of the invention described herein are contemplated from and may be read from both an open-ended and inclusive view (i.e. using "comprising of" language) and a closed and exclusive view (i.e. using "consisting of" language). As used herein parentheses are used designate 1) that the something is optionally present such that monomer(s) means monomer or monomers or (meth)acrylate means methacrylate or acrylate, 2) to qualify or further define a previously mentioned term, or 3) to list narrower embodiments.

While certain representative embodiments and details have been shown for the purpose of illustrating the subject invention, it will be apparent to those skilled in this art that various changes and modifications can be made therein without departing from the scope of the subject invention.

What is claimed is:

1. A liquid telechelic prepolymer comprising the reaction product of a telechelic polyamide, a polyisocyanate, and optionally other molecules with functional groups that react with isocyanate groups; wherein the polyisocyanate is characterized by having two or more isocyanate groups, the telechelic polyamide is characterized as having repeating units connected by linkages between the repeating units and having two or more Zerewitinoff groups that chemically react with isocyanate groups to form a chemical bond between a portion of said Zerewitinoff groups and the isocyanate group, further wherein the telechelic polyamide comprises repeat units connected with chemical linkages wherein desirably at least 10% of the total number of the heteroatom containing linkages connecting hydrocarbon type linkages are characterized as being amide linkages, at least 25% of the amide linkages are characterized as being tertiary amide linkages, and said liquid telechelic prepolymer having a viscosity measured by a Brookfield circular disc viscometer with the circular disc spinning at 5 rpm of less than 100,000 cps at a temperature of 70° C.

2. The liquid telechelic prepolymer according to claim 1, further comprising a surface active dispersing agent as part of the prepolymer or as a separate molecule dissolved in said prepolymer.

3. The liquid telechelic prepolymer according to claim 2, wherein said surface active dispersing agent comprises a nonionic oligomer chemically bound to said prepolymer.

4. The liquid telechelic prepolymer according to claim 3, wherein said surface active dispersing agent comprise anionic species chemically bound to said prepolymer.

5. The liquid telechelic prepolymer according to claim 3, wherein said surface active dispersing agent comprises a cationic species chemically bound to said prepolymer.

6. The liquid telechelic prepolymer according to claim 4, wherein said anionic species comprises a carboxylic acid group.

7. The liquid telechelic prepolymer according to claim 5, wherein said cationic species comprises a salt of a tertiary amine or a quaternary ammonium group.

8. The liquid telechelic prepolymer according to claim 1, wherein said telechelic polyamide is characterized by having a weight average molecular weight of less than 10,000 g/mole.

9. The liquid telechelic prepolymer according to claim 1, further comprising a solvent.

10. The liquid telechelic prepolymer according to claim 1, wherein said prepolymer is formed by a ratio of isocyanate groups of said polyisocyanate to Zerewitinoff groups from said telechelic polyamide and optional other molecules from 20:1 to 1:1.

11. The liquid telechelic prepolymer according to claim 1, formed into a dispersion in an aqueous media.

12. The liquid telechelic prepolymer according to claim 2 formed into a dispersion in aqueous media, optionally chain extended into a polymer and optionally containing a second polymer, said second polymer being without polyamide segments, said second polymer optionally either blended in a dispersed phase with said colloidally stabilized telechelic prepolymer or separately dispersed in water and thereafter blended with said colloidally stabilized telechelic prepolymer dispersed in water, wherein said optional second polymer, when present, is present in an amount of at least 10 wt. % based on the total polymeric solids in the dispersion and optionally where said second polymer is added as free radically polymerizable monomer(s) and thereafter is free radically polymerized into a second polymer, wherein said free radically polymerizable monomer(s) are added to said telechelic prepolymer prior to dispersion of said prepolymer in water or said monomer(s) being added to said prepolymer after the prepolymer is formed into a dispersion.

13. The liquid telechelic prepolymer, according to claim 11, wherein said telechelic prepolymer is chain extended and formed into a self-supporting film, a coating, or an adhesive.

14. The liquid telechelic prepolymer, according to claim 1, wherein at least 80% of said amide linkages are characterized as tertiary amide linkages, wherein said telechelic prepolymer is characterized as the reaction product of a hydroxyl terminated polyamide with a polyisocyanate and optionally other molecules, and said telechelic polyamide is comprised of one or more repeat units from a lactone of 4 to 10 carbon atoms and/or a hydroxyl carboxylic acid of 3 to 30 carbon atoms (in one embodiment said lactone and/or hydroxyl carboxylic acid is added after polymerization of an amine terminated polyamide and reacted with said amine terminated polyamide to convert to a hydroxyl terminated polyamide by being the terminal repeat unit on one or both ends of the polyamide).

15. The liquid telechelic prepolymer, according to claim 1, wherein at least 50 wt. % of said polyamide oligomer comprises repeat units of the structure

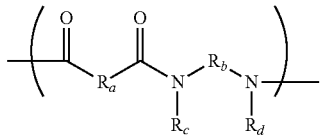

wherein $R_a$ is the alkylene portion of the dicarboxylic acid and is a cyclic, linear, or branched, optionally including aromatic groups alkylene of 2 to 36 carbon atoms, optionally including up to 1 heteroatom per 3 or 10 carbon atoms of the diacid, and wherein $R_b$ is a direct bond or a linear or branched, optionally being or including cyclic, heterocyclic, or aromatic portion(s), alkylene group, optionally containing up to 1 or 3 heteroatoms per 10 carbon atoms, of 2 to 60 carbon atoms and $R_c$ and $R_d$ connect together form a single linear or branched alkylene group of 1 to 8 carbon atoms.

16. The liquid telechelic prepolymer, according to claim 1, wherein at least 70 wt. % of said polyamide oligomer comprises repeat units of the structure

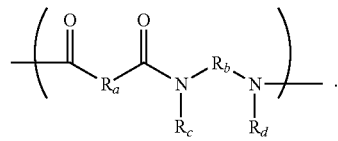

17. The liquid telechelic prepolymer, according to claim 1, wherein at least 80 wt. % of said polyamide oligomer comprises repeat units of the structure

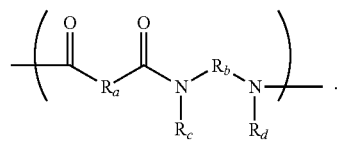

18. The liquid telechelic prepolymer according to claim 11 formed into a dispersion in water, wherein at least 50 wt. % of said polyamide oligomer comprises repeat units of the structure

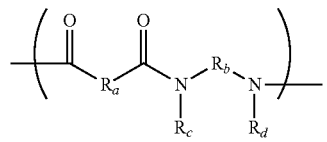

wherein $R_a$ is the alkylene portion of the dicarboxylic acid and is a cyclic, linear, or branched, optionally including aromatic groups alkylene of 2 to 36 carbon atoms, optionally including up to 1 heteroatom per 3 or 10 carbon atoms of the diacid, and wherein $R_b$ is a direct bond or a linear or branched, optionally being or including cyclic, heterocyclic, or aromatic portion(s), alkylene group, optionally containing up to 1 or 3 heteroatoms per 10 carbon atoms, of 2 to 60 carbon atoms and $R_c$ and $R_d$ connect together form a single linear or branched alkylene group of 1 to 8 carbon atoms.

19. The liquid telechelic prepolymer according to claim 18 formed into a dispersion in water, wherein at least 80 wt. % of said polyamide oligomer comprises repeat units of the structure

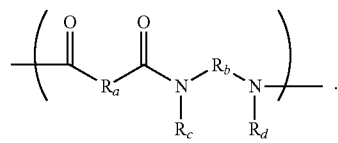

* * * * *